(12) United States Patent
Lin et al.

(10) Patent No.: US 11,460,761 B2
(45) Date of Patent: Oct. 4, 2022

(54) OPERATION METHOD OF REMOTE LASER PROJECTION DEVICE

(71) Applicant: DELTA ELECTRONICS, INC., Taoyuan (TW)

(72) Inventors: Yu-Nien Lin, Taoyuan (TW); Ming-Yo Hsu, Taoyuan (TW); Yi-Chen Tsai, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 17/012,060

(22) Filed: Sep. 4, 2020

(65) Prior Publication Data

US 2021/0318601 A1 Oct. 14, 2021

(30) Foreign Application Priority Data

Apr. 13, 2020 (CN) .......................... 202010284849.1

(51) Int. Cl.
*G03B 21/20* (2006.01)
*G02B 6/42* (2006.01)

(52) U.S. Cl.
CPC ....... *G03B 21/2013* (2013.01); *G02B 6/4204* (2013.01); *G03B 21/208* (2013.01); *G03B 21/2033* (2013.01)

(58) Field of Classification Search
CPC ............ G03B 21/2013; G03B 21/2033; G03B 21/208; G02B 6/4204
See application file for complete search history.

(56) References Cited

U.S. PATENT DOCUMENTS

| 5,661,837 A * | 8/1997 | Yamamoto ........... G02B 6/0008 385/115 |
| 5,765,934 A * | 6/1998 | Okamori ............... H04N 9/315 353/38 |
| 6,309,072 B1 * | 10/2001 | Deter ...................... H04N 9/12 348/750 |
| 6,513,937 B1 * | 2/2003 | Dehmlow ........... G02B 6/2804 385/115 |
| 6,661,820 B1 | 12/2003 | Camilleri et al. |
| 7,014,318 B2 * | 3/2006 | Dho ...................... H04N 9/3129 348/E9.026 |
| 8,059,928 B2 | 11/2011 | Domm |
| 8,965,161 B2 | 2/2015 | Domm et al. |
| 10,025,174 B1 * | 7/2018 | Tait ...................... H04N 9/3155 |

(Continued)

FOREIGN PATENT DOCUMENTS

| CN | 102156378 A * | 8/2011 | ............ G03B 21/20 |
| CN | 102156378 A | 8/2011 | |

(Continued)

*Primary Examiner* — Magda Cruz
(74) *Attorney, Agent, or Firm* — CKC & Partners Co., LLC

(57) ABSTRACT

An operation method of a remote laser projection device includes emitting a first light to an optical transmission module through at least one light source module; transmitting the first light to at least one projection head through the optical transmission module, wherein total light energy of the first light is allocated to the projection head through the optical transmission module, such that energy of a light transmitted to the projection device is E/N, and wherein E is total light energy of the at least one light module, and N is a number of the at least one projection device.

20 Claims, 17 Drawing Sheets

(56) References Cited

U.S. PATENT DOCUMENTS

| | | | | |
|---|---|---|---|---|
| 2010/0002195 A1* | 1/2010 | Yagyu | ............... | H04N 9/3164 |
| | | | | 353/30 |
| 2012/0044459 A1* | 2/2012 | Klein | ............... | H04N 13/363 |
| | | | | 353/8 |
| 2012/0105812 A1* | 5/2012 | Dekker | ............ | H04N 9/3129 |
| | | | | 353/31 |
| 2012/0133901 A1* | 5/2012 | Miura | ............ | G03B 21/2033 |
| | | | | 353/31 |
| 2014/0104578 A1* | 4/2014 | Madamopoulos | ..................... | |
| | | | | G03B 21/2033 |
| | | | | 353/31 |
| 2017/0045810 A1* | 2/2017 | Huang | ............ | G02B 27/141 |
| 2020/0159092 A1 | 5/2020 | Rebiffe | | |

FOREIGN PATENT DOCUMENTS

| | | | |
|---|---|---|---|
| CN | 106647128 A | 5/2017 | |
| CN | 107608167 A | 1/2018 | |
| TW | 201226973 A1 | 7/2012 | |
| TW | 201706697 A | 2/2017 | |
| TW | 201831978 A | 9/2018 | |

* cited by examiner

OPERATION METHOD OF REMOTE LASER PROJECTION DEVICE

CROSS-REFERENCE TO RELATED APPLICATION

This application claims priority to Chinese Application Serial Number 202010284849.1, filed Apr. 13, 2020, which is herein incorporated by reference in its entirety.

BACKGROUND

Field of Invention

The present invention relates to an operation method of a laser projection device. More particularly, the present invention relates to an operation method of a remote laser projection device.

Description of Related Art

The projection head and the light source module of the projection device nowadays are mounted in the same housing of the projection device. Therefore, power and brightness of the projection device are fixed, and adjust based on environment change for the power and the brightness are not available. In addition, when the projection head or the light source module is abnormal or adjustment is required, it is necessary to shut down the projection head or the light source module.

Accordingly, how to provide a projection device that may allocated power of the projector and employee remote control is still one of the develop direction for those in the industry.

SUMMARY

One aspect of the present disclosure provides an operation method of a remote laser projection device.

In some embodiments of the present disclosure, the operation method of a remote laser projection device includes emitting a first light to an optical transmission module through at least one light source module; and transmitting the first light to at least one projection head through the optical transmission module. Total light energy of the first light is allocated to the projection head through the optical transmission module, such that energy of a light transmitted to the projection device is E/N. E is total light energy of the at least one light module, and N is a number of the at least one projection device.

In some embodiments of the present disclosure, the optical transmission module includes at least one optical fiber, and the first light includes at least one color light. Transmitting the first light to the projection head through the optical transmission module further includes transmitting the color light to the projection head through the optical fiber.

In some embodiments of the present disclosure, a number of the at least one light module is plural, and emitting the first light to the optical transmission module through the light source module further includes transmitting the first light of each of the light modules to an optical coupler through at least one source terminal transmission device; coupling the first lights of the light source modules through the optical coupler to produce a second light to a source terminal node, wherein energy of the first lights are combined through the optical coupler; and transmitting the second light to the projection head through the source terminal node of the optical transmission module.

In some embodiments of the present disclosure, the first light emitted from each of the light source modules is an effective white light or includes a plurality of color lights with different colors emitted based on a time sequence.

In some embodiments of the present disclosure, the optical transmission module further includes a plurality of optical coupling elements. Each of the first lights includes a plurality of color lights with different colors, the optical coupling elements respectively correspond to the light source modules, and the operation method of the remote laser projection device further includes before transmitting each of the first lights to the optical coupler through the source terminal transmission device, coupling the color lights from each of the light source modules through the corresponding optical coupling element.

In some embodiments of the present disclosure, the first light includes a plurality of color lights with different colors, and the operation method of the remote laser projection device further includes transmitting the color lights of each of the first lights to the optical coupler through the source terminal transmission device before transmitting the first light of each of the light source modules to the optical coupler through the source terminal transmission device.

In some embodiments of the present disclosure, a number of the at least one projection head is plural, and transmitting the second light to the projection head through the source terminal node of the optical transmission module further includes transmitting the second light of the light source modules to a machine terminal node of optical transmission module from the source terminal node; equally splitting the second light through an optical splitter to produce a plurality of third lights to a plurality of machine terminal transmission devices, wherein the machine terminal transmission devices correspond to the projection heads, and the optical splitter equally split energy of the second light; and respectively transmitting the third lights to the projection heads through the machine terminal transmission devices.

In some embodiments of the present disclosure, the first light emitted from each of the light source modules is an effective white light or includes a plurality of color lights with different colors emitted based on a time sequence.

In some embodiments of the present disclosure, the operation method of the remote laser projection device further includes transmitting the second light to the machine terminal node through a homogenizer before transmitting the second light of the light source modules to the machine terminal node of the projection head.

In some embodiments of the present disclosure, a number of the at least one light source module is single, a number of the at least projection head is plural, and the operation method of the remote laser projection device further includes transmitting the first light of the light source module to a machine terminal node of the optical transmission module; equally splitting the first light through an optical splitter to produce a plurality of second lights to a plurality of machine terminal transmission devices, wherein the machine terminal transmission devices correspond to the projection devices, and the optical splitter equally split total energy of the first light; and transmitting the second lights to the projection heads respectively through the machine terminal transmission devices.

In some embodiments of the present disclosure, the first light emitted from the light source module is an effective white light or includes a plurality of color lights with different colors emitted based on a time sequence.

In some embodiments of the present disclosure, the optical transmission module further includes a plurality of optical coupling elements, the first light includes a plurality of color lights with different colors, and the operation method of the remote laser projection device further includes coupling the color lights from the light source module through the optical coupling element to a source terminal transmission device before transmitting the first light of the light source module to the machine terminal node of the optical transmission device.

In some embodiments of the present disclosure, the first light includes a plurality of color lights with different colors, and the operation method of the remote laser projection device further includes transmitting the color lights of the first light respectively through a source terminal transmission device to an optical coupler before transmitting the first light of the light module to the machine terminal node of the optical transmission device.

In some embodiments of the present disclosure, the operation method of a remote laser projection device further includes transmitting the first light through a homogenizer to the machine terminal node before transmitting the first light of the light module to the machine terminal node of the optical transmission device.

In some embodiments of the present disclosure, the operation method of the remote laser projection device further includes turning on or turning off each of the light source module and the projection head through a controller.

In some embodiments of the present disclosure, a number of the projection device is plural, and the operation method of the remote laser projection device further includes emitting a detecting signal through the light source module; and determining whether at least one of the optical transmission device, the light source module, and the projection head is abnormal based on the detecting signal received by the projection head.

In some embodiments of the present disclosure, the detecting signal is invisible light, and at least one of the projection devices is turned on.

Another aspect of the present disclosure is an operation method of a remote laser projection device In some embodiments of the present disclosure, the operation method of a remote laser projection device includes emitting a first light to an optical transmission module through at least one light source module; transmitting the first light to a plurality of projection heads through the optical transmission module. Total light energy of the first light is allocated to the projection heads through the optical transmission module, the first light is transmitted by the optical transmission module through the optical fibers, and the first light is an effective white light.

In some embodiments of the present disclosure, the optical transmission module includes a plurality of optical fibers, the first light includes at least one color light, and transmitting the first light to the projection heads through the optical transmission module further includes transmitting the color light to the projection head through the optical fibers.

In some embodiments of the present disclosure, emitting the first light to the optical transmission module through the light source module further includes transmitting the first light of the light source module to a machine terminal node of the optical transmission module; and splitting the first light through a splitter to produce a plurality of second lights to a plurality of machine terminal transmission devices. The machine terminal transmission devices correspond to the projection heads. Transmitting the first light to the projection head through the optical transmission module further includes transmitting the second lights to the projection heads respectively through the machine terminal transmission devices.

In some embodiments of the present disclosure, the optical transmission module further includes an optical coupling element, the first light comprises a plurality of color lights with different colors, and emitting the first light to the optical transmission module through the light source module further includes coupling the color lights from the light source module to a source terminal transmission device through the optical coupling element before transmitting the first light of the light source module to the machine terminal node of the optical transmission module.

In some embodiments of the present disclosure, the first light includes a plurality of color lights with different colors, and emitting the first light to the optical transmission module through the light source module further includes transmitting the color lights of the first light to an optical coupling element respectively through a source terminal transmission device before transmitting the first light of the light source module to the machine terminal node of the optical transmission module.

In some embodiments of the present disclosure, the operation method of the remote laser projection device further includes transmitting the first light to the machine terminal node through a homogenizer before transmitting the first light of the light source module to the machine terminal node of the optical transmission module.

In some embodiments of the present disclosure, a number of the at least one light source module is plural, and transmitting the first lights of the light source modules to the machine terminal node of the optical transmission module further includes transmitting the first light of each of the light source modules to an optical coupler through at least one source terminal transmission device; coupling the first lights of the light source modules to a source terminal node of the optical transmission module through the optical coupler, wherein light energy of the first lights is combined through the optical coupler; and transmitting the coupled first lights to the machine terminal nodes through the optical coupler.

In the aforementioned embodiments, light energy from the light source modules may be allocated (combine or split) to the projection heads through the optical transmission module (the optical fiber, the optical splitter, and the optical coupler etc.) in the operation method of the remote laser projection device of the present disclosure. As such, the limit of the typical projection device that the light source and the projection head are located in the same housing may be overcome. Therefore, light energy of the projection head may be adjusted based on change of environment.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
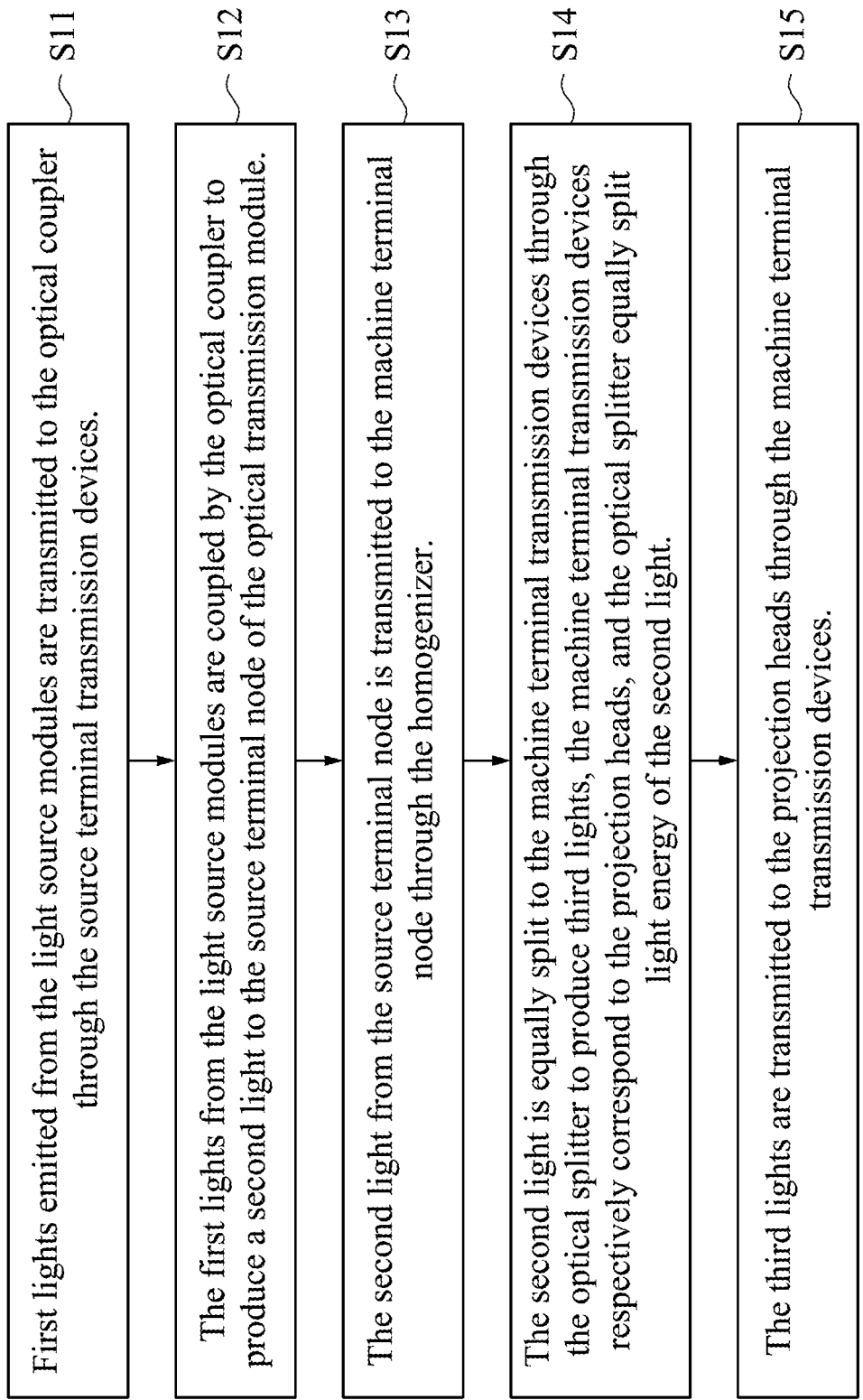
FIG. 1 is a flow chart of an operation method of a laser projection device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2A:
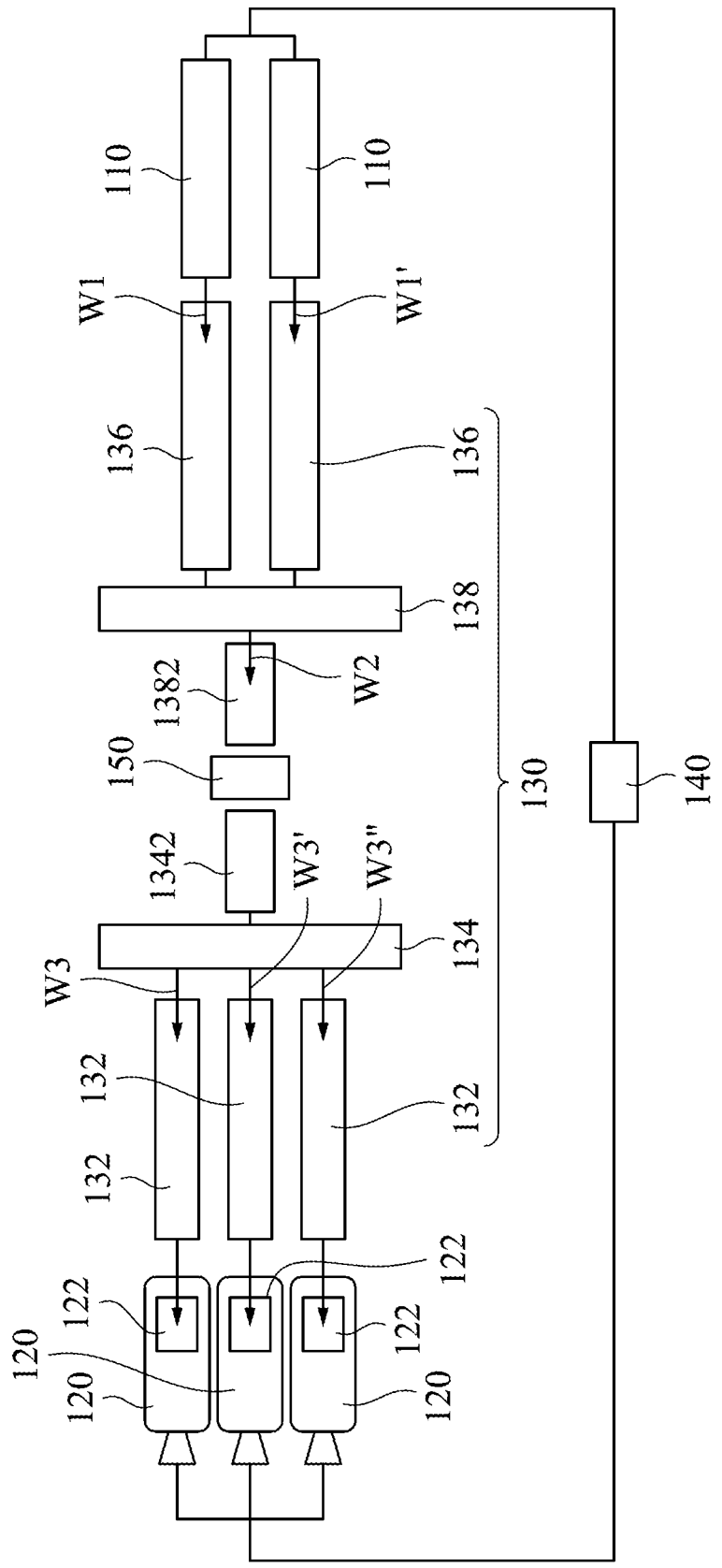
FIGS. 2A to 2D are schematics of a laser projection device according to some embodiments of the present disclosure.

FIG. 1 is a flow chart of an operation method of a laser projection device according to some embodiments of the present disclosure. FIGS. 2A to 2D are schematics of a laser projection device 100 according to some embodiments of the present disclosure. Reference is made to FIG. 1 and FIG. 2A. The laser projection device 100 includes light source modules 110, projection heads 120, an optical transmission module 130, a controller 140, and a homogenizer 150. In the present embodiment, a number of the light source module 110 is two, and a number of the projection heads is three. The optical transmission module 130 includes three machine terminal transmission device 132 (e.g., optical fiber), an optical splitter 134, a machine terminal node 1342, two source terminal transmission device 136 (e.g., optical fiber), optical coupler 138 and a source terminal node 1382.

The machine terminal transmission device 132 is respectively connected to three projection heads 120, and the source terminal transmission device 136 is respectively connected to two light source modules 110. The optical splitter 134 is configured to split the light from the machine terminal node 1342 to a plurality of lights corresponding to the machine terminal transmission device 132. The optical coupler 138 is configured to couple the multiple lights from the source terminal transmission device 136 to the source terminal node 1382. It is noted that the optical splitter and the optical coupler is respectively used to split or combine light. For example, they may be groups of prisms or lens coated with optical coating, or other devices that can split or couple lights. Therefore, the light can be split equally to multiple lights through the optical splitter 134, or the light can be split to multiple lights with different energy through the optical splitter 134. The controller 140 is configured to control the switches of the light source modules 110 and the projection heads 120. The homogenizer 150 is configured to homogenize the light from the source terminal node 1382 and transmit the light to the machine terminal node 1342 to reduce light energy loss and increase light utilization rate.

In the present embodiment, the light emitted from each of the light source module 110 is white light W1. It is noted that the white light is an effective white light. For example, the white light may include RGB color lights in one time sequence or the white light is formed by a plurality of color lights combined together (e.g., yellow light and blue light, or RGB color lights). The projection head 120 may project the effective white light to project images by time divisional method or color separation method. Each of the projection head 120 includes a light splitting device 122 such as filter color wheel or the color splitting prism. In step S11 of the operation method of the laser projection device 100, a first light emitted from the light source module 110 is transmitted to the optical coupler 138 through the source terminal transmission device 136. In the present embodiment, the first lights emitted by the two light source modules 110 are respectively the white light W1 and the white light W1'. Light energy of the white light W1 may be different from or be the same as light energy of the white light W1'. In step S12, the first lights (the white lights W1, W1') are coupled by the optical coupler 138 to produce a second light (the white light W2) to the source terminal node 1382 of the optical transmission module 130. The optical coupler 138 may combine light energy of multiple first lights (the white lights W1, W1'). In the present embodiment, light energy of the white light W2 is combined from two first lights (the white lights W1, W1') that are coupled by the optical coupler 138. Light energy of the white light W2 is a sum of light energy of the first lights (the white lights W1, W1'). In step S13, the second light (the white light W2) from the source terminal node 1382 is transmitted to the machine terminal node 1342 through the homogenizer 150. In step S14, the second light (the white light W2) is equally split to three machine terminal transmission device 132 through the optical splitter 134 to produce third lights (the white lights W3, W3', W3"). In one embodiment, the machine terminal transmission devices 132 respectively correspond to the projection heads 120. The second light (the white light W2) with combined light energy is equally split to three third lights (the white light W3, W3', W3") that have equal light energy. Therefore, light energy of the third light (the white light W3, W3', W3") that enters each of the projection heads 120 is one third of light energy of the second light (the white light W2). In another embodiment, the second light (the white light W2) with combined light energy may be unequally split to third lights (the white light W3, W3', W3") with different light energy. In step S15, the third lights (the white light W3, W3', W3") are transmitted to the projection heads 120 through the machine terminal transmission device 132 to project images.

In the present embodiment, the light source module 110 and the projection heads 120 are connected through the optical transmission module 130, but not mounted in the housing of the same projection device. Therefore, remote control of the laser projection device 100 can be achieved by employing the controller 140. In the present embodiment, light energy from the light source module 110 can be combined through the optical coupler 138, and the combined energy may be allocated to three part (equally split or unequally split) through the optical splitter 134 so as to reorganize light energy from the light source modules 110 to multiple projection heads 120. For example, when higher brightness is required for the projected images, numbers of the light source modules 110 may be increased. When different images or larger images are stitched, numbers of the projection heads 120 may be increased. In addition, although light energy from the light source modules 110 may decay when light energy is split or combined through the optical splitter 134 or the optical coupler 138, the optical coupler 138 and the homogenizer 150 may combine and integrate light energy so as to maintain light energy allocated to each of the projection heads 120.

In some embodiments, at least one of the projection head 120 can be controlled by the controller 140 to be turned off during operation such that this projection head 120 which is turned off may be employed as a backup projection head 120. Similarly, in some embodiment, at least one of the light source module 110 can be controlled by the controller 140 to be turned off during operation so as to employee this light source module 110 which is turned off as a backup light source module 110. For example, since light energy from the projection head 120 is allocated through the optical splitter (that is, the white light W3, W3', W3" all have a part of total light energy of the white light W1, W1'), the controller 140 may turn on the backup projection head 120 or the backup light source module 110 to replace the failed one when any one of the projection head 120 or the light source module 110 in operation fails or is abnormal.

For example, if light energy of the projection head 120 is equally split through the optical splitter 134, the number of the projection heads 120 in operation is three, and the number of the backup projection head 120 is one, the total energy light is three fourths of the maximum light energy of the laser projection device 100 (that is the total light energy when all the projection heads are turned on). When one of the projection heads 120 fails, the backup projection head 120 can be turned on so as to recover the light energy of the laser projection device 100 to three fourths of the maximum light energy.

Figure 2B:
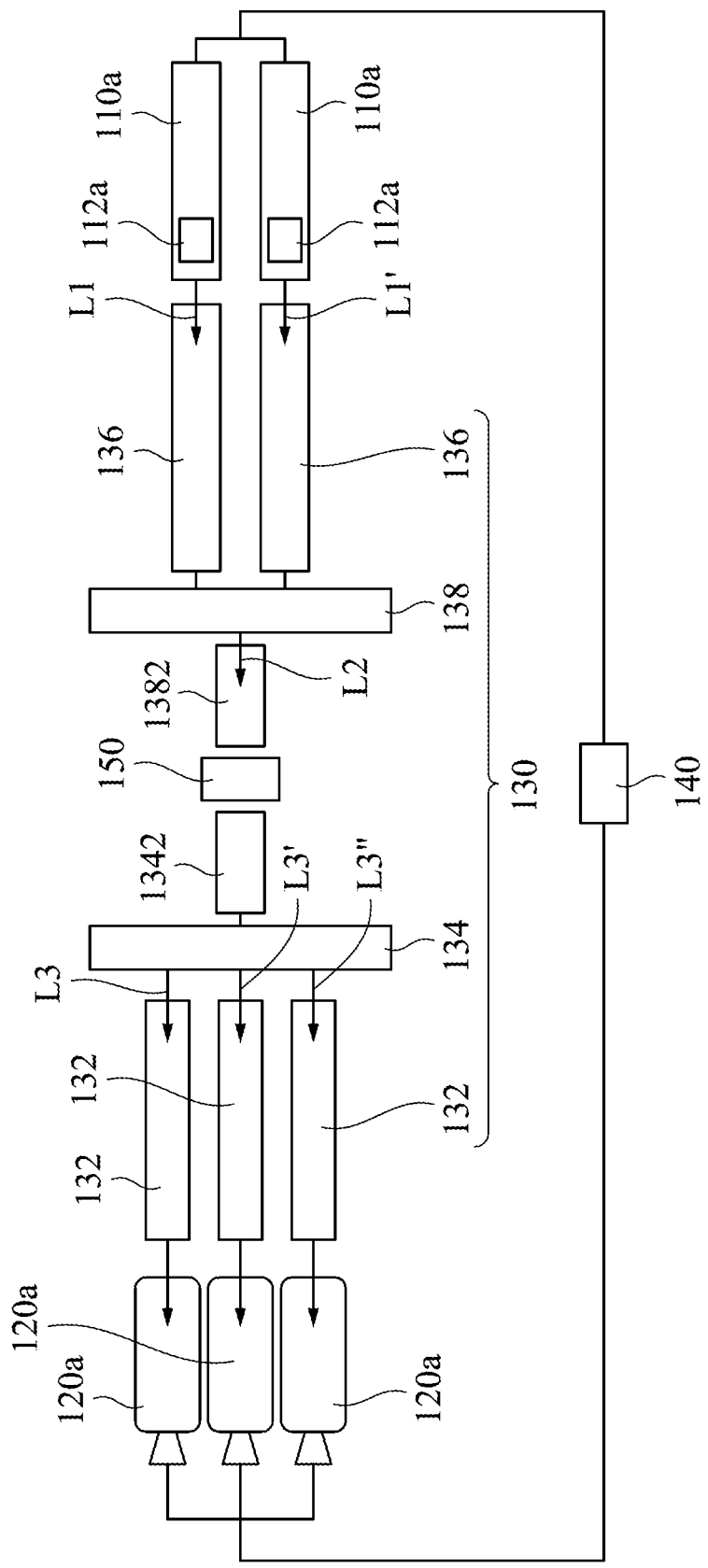

FIG. 2B is schematics of a laser projection device 100a according to some embodiments of the present disclosure. The laser projection device 100a is substantially the same as the laser projection device 100 shown in FIG. 2A, the difference is that the light source modules 110a includes light splitting device 112a, and the light L1 emitted from each of the light source module 110a includes different color lights emitted based on a time sequence. For example, the white light may be sequentially filtered through a filter color wheel so as to produce red light, blue light, and green light, but the present disclosure is not limited in this regard. For example, another configuration of the light splitting device 112a may be a phosphor wheel (not shown) containing multiple wave bands so as to sequentially produce red light, blue light, and green light by exciting the corresponding wave band. The light source module 110a may include RGB color light sources, and the light splitting device 112a is a controller or a switch such that the color lights can be emitted based on the time sequence.

Reference is made to FIG. 1 and FIG. 2B simultaneously. In step S11 of the operation method of the laser projection device 100a, the first light (the light L1 and the light L1') emitted from the light source module 110a is transmitted to the optical coupler 138 through the source terminal transmission device 136. Light energy of the light L1 and light energy of the light L1'may be the same or may be different. In the present embodiment, the first lights (the lights L1, L1') emitted from the two light source modules 110a may be different color lights that simultaneously emitted based on a time sequence. For example, a red light, a blue light, and a green light emitted sequentially based on the time sequence. In step S12, the first lights (the lights L1, L1') are coupled through the optical coupler 138 to produce the second light (the light L2) to the source terminal node 1382 of the optical transmission module 130. The optical coupler 138 may combine light energy of multiple first lights (the lights L1, L1'). In the present embodiment, the light L1 and the light L1 emitted from the two light source module 110a are coupled through optical coupler 138 to the source terminal node 1382 to produce the second light (the light L2). Light energy of the light L2 is sum of light energy of the first lights (the lights L1, L1'). In step S13, the second light (the light L2) from the source terminal node 1382 is transmitted to the machine terminal node 1342 through the homogenizer 150. In step S14, the second light (the light L2) from the machine terminal node 1342 is allocated (equally allocated or unequally allocated) to three machine terminal transmission device 132 through the optical splitter 134. In one embodiment, the second light (the light L2) with combined light energy is equally split to three third lights (the light L3, L3', L3") that have equal light energy. Therefore, light energy of the third light (the light L3, L3', L3") that enters each of the projection heads 120a is one third of light energy of the second light (the light L2). In another embodiment, the second light (the light L2) with combined light energy may be unequally split to third lights (the light L3, L3', L3") with different light energy. In step S15, the third lights (the light L3, L3', L3") with different colors based on the time sequence are transmitted to the projection heads 120a through the machine terminal transmission device 132 to project images. The laser projection device 100a has similar advantages as the laser projection device 100 shown in FIG. 2A, and the description is not repeated hereinafter.

Figure 2C:
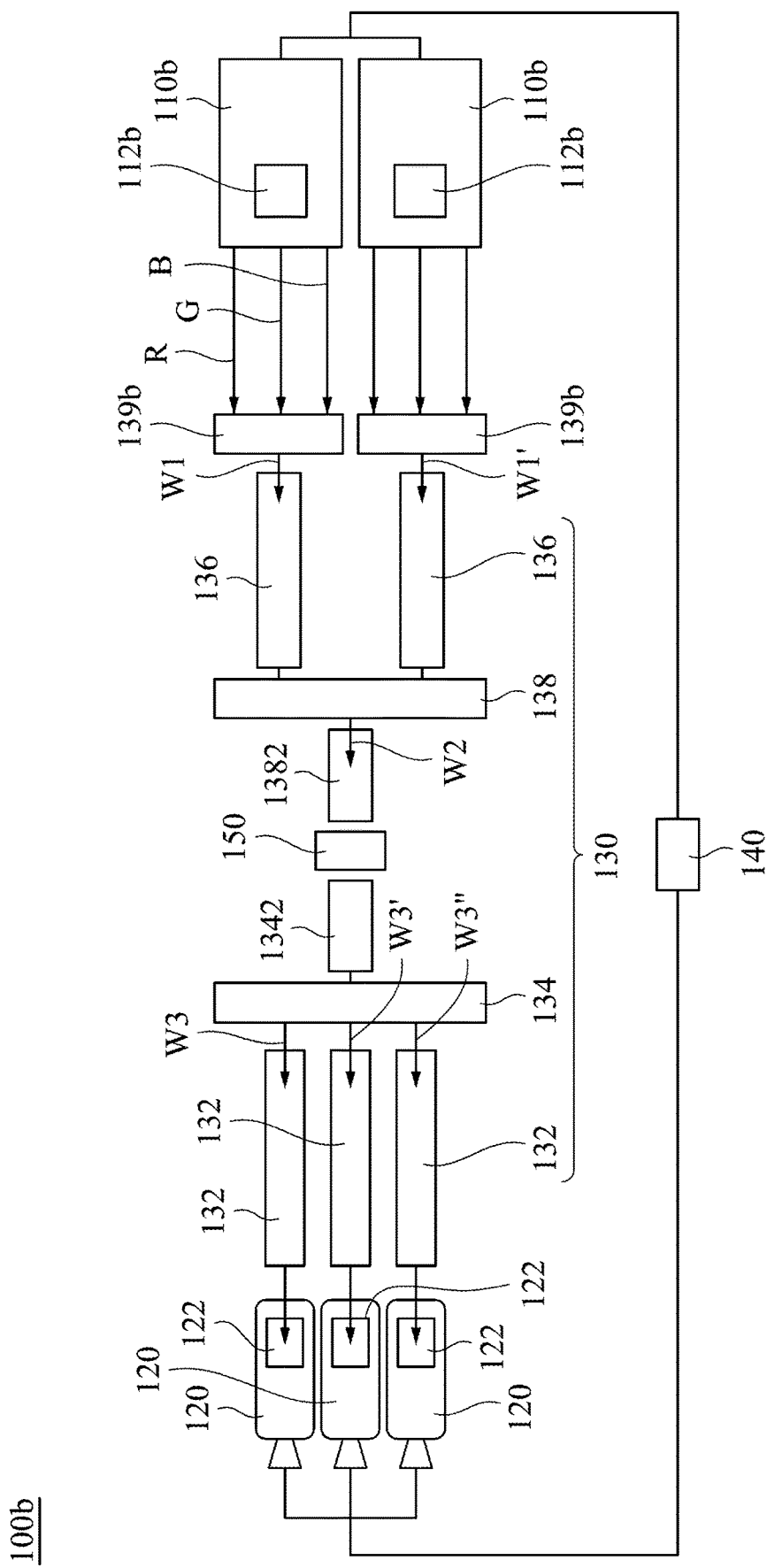

FIG. 2C is schematics of a laser projection device 100b according to some embodiments of the present disclosure. The laser projection device 100b is substantially the same as the laser projection device 100a shown in FIG. 2B, the difference is that the light source modules 110b is configured to emit the first light with multiple color lights with different colors through the light splitting device 112b. For example, the color lights may be a red light R, a blue light B, and a green light G, but the present disclosure is not limited in this regard. In addition, the projection head 120 includes light splitting device 122, the laser projection device 100b further includes an optical coupling element 139b, and the number of the optical coupling element 139b and the number of the light source module 110b are the same. In some embodiments, the optical coupling element 139b may be a prism.

Reference is made to FIG. 1 and FIG. 2C. In step S11 of the operation method of the laser projection device 100b, the first light emitted from the light source module 110b includes three color lights with different colors (the red light R, the blue light B, and the green light G), and the first light (the red light R, the blue light B, and the green light G) is transmitted to the optical coupler 138 through the source terminal transmission device 136. In the present embodiment, step S11 further includes coupling three color lights (the red light R, the blue light B, and the green light G) through the optical coupling element 139b to a white light W1 and a white light W1' and transmitting the white lights W1, W1' to the corresponding source terminal transmission devices 136. Light energy of the white light W1 and light energy of the white light W1' may be the same or may be different. Subsequently, the white lights W1, W1' from the two source terminal transmission devices 136 are transmitted to the optical coupler 138. In step S12 to step S15, the operation method of the laser projection device 100b is substantially the same as the laser projection device 100, and the description is not repeated in this regard.

Figure 2D:
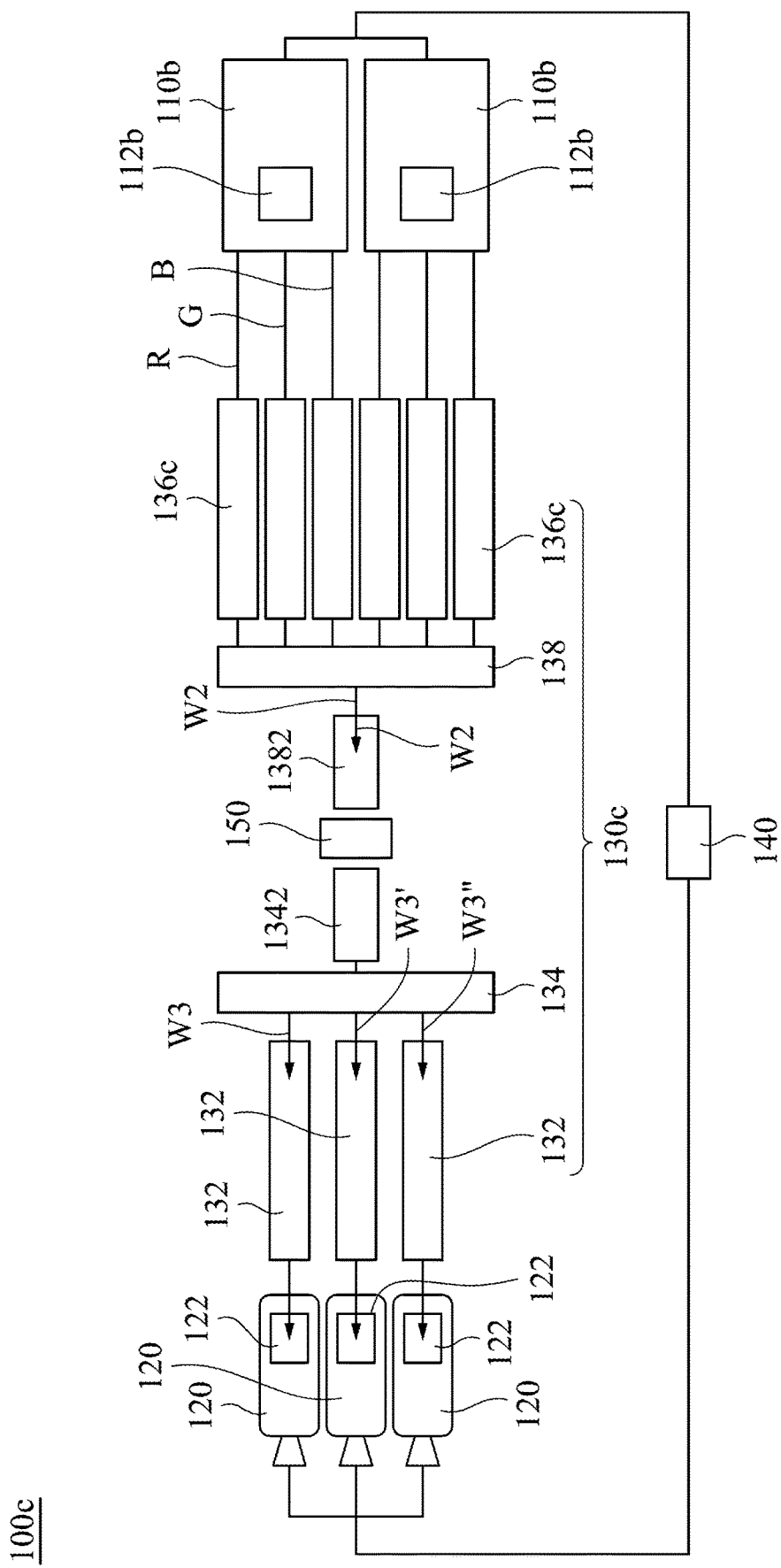

FIG. 2D is schematics of a laser projection device 100c according to some embodiments of the present disclosure. The laser projection device 100c is substantially the same as the laser projection device 100b shown in FIG. 2C, the difference is that the number of the source terminal transmission device 136c of the optical transmission module 130c and the number of the color lights are the same. For example, in the present embodiments, the first light of each of the light source modules 110b includes three color lights with different colors (the red light R, the blue light B, and the green light G), and each of the light source module 110b corresponds to three source terminal transmission device 136c.

Reference is made to FIG. 1 and FIG. 2D. In step S11 of the operation method of the laser projection device 100c, the first light emitted from the light source module 110b includes three color lights with different colors (the red light R, the blue light B, and the green light G), and the first light (the red light R, the blue light B, and the green light G) is transmitted to the optical coupler 138 through the source terminal transmission device 136. In the present embodiment, step S11 further includes transmitting each of the light emitted form the two light source module 110b to the optical coupler 138 through corresponding source terminal transmission device 136c. In step S12, three color lights of each of the two first lights are coupled through the optical coupler 138 to produce a second light (the white light W2). Light energy of the white light W2 is combined from six color lights. In step S13 to step S15, the operation method of the laser projection device 100c is substantially the same as the laser projection device 100, and the description is not repeated in this regard.

It is noted that the connection relationships described above will not be repeated. In the following description, an operation method when numbers of the light source module or the projection head is single will be described.

Figure 3:
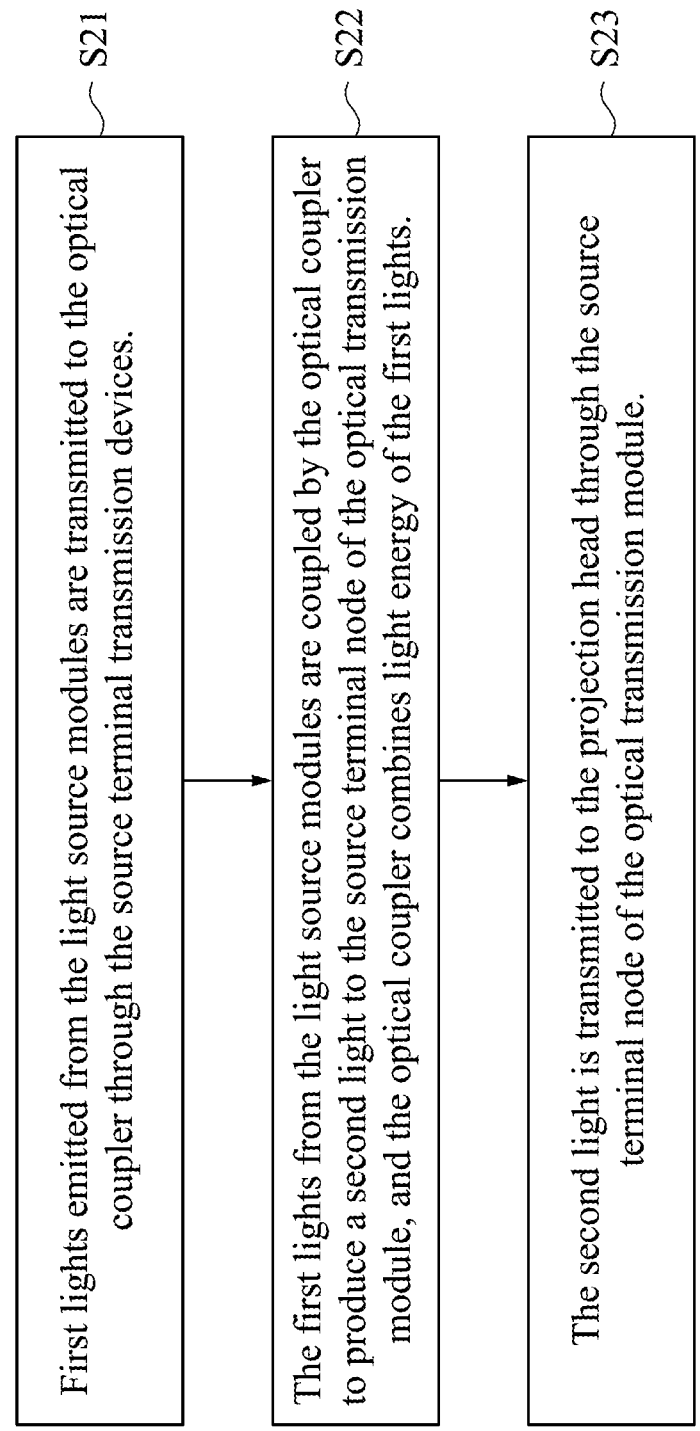
FIG. 3 is a flow chart of an operation method of a laser projection device according to some embodiments of the present disclosure.
Figure 4A:
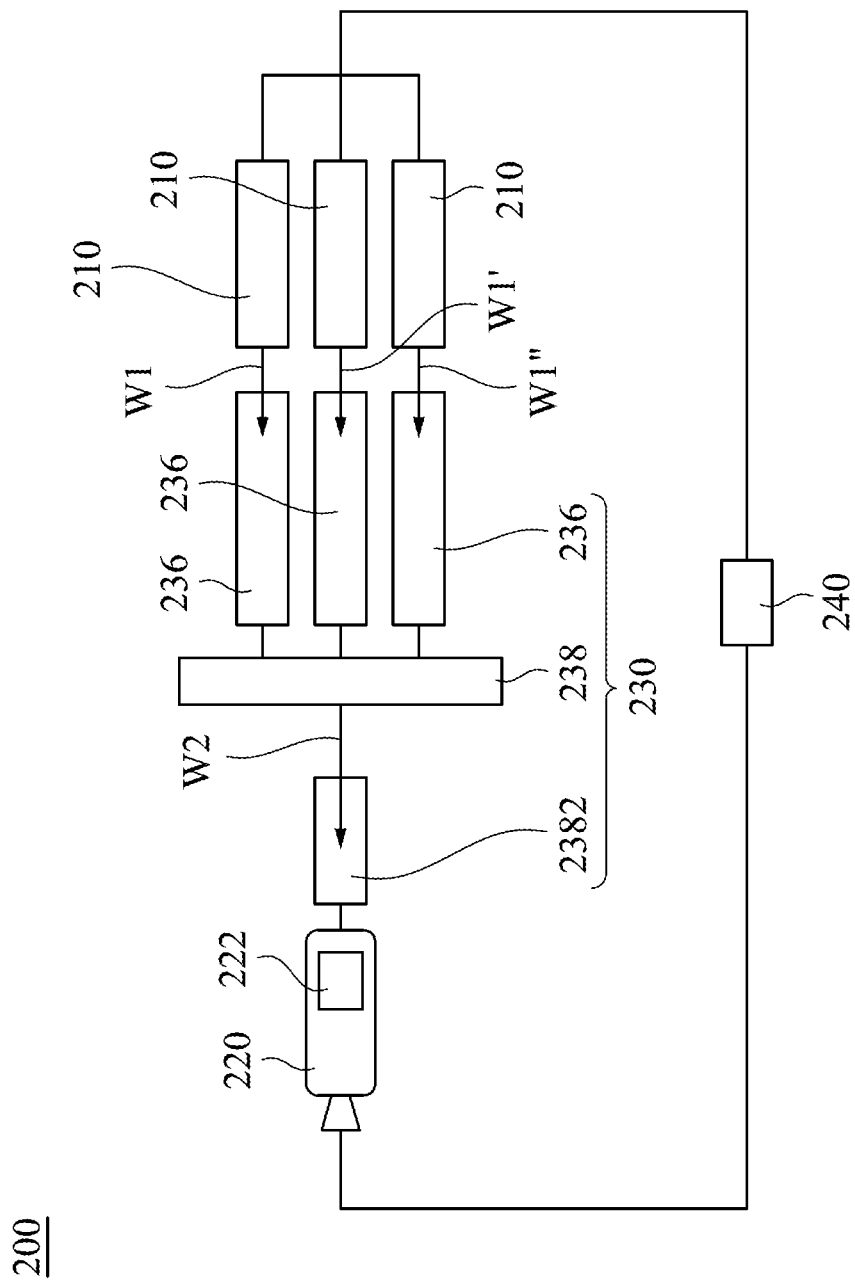
FIGS. 4A to 4B are schematics of a laser projection device according to some embodiments of the present disclosure.

FIG. 3 is a flow chart of an operation method of a laser projection device according to some embodiments of the present disclosure. FIG. 4A is a schematic of a laser projection device 200 according to some embodiments of the present disclosure. Reference is made to FIG. 3 and FIG. 4A. The laser projection device 200 includes light source modules 210, a projection head 220, an optical transmission module 230, and a controller 240. In the present embodiment, a number of the light source modules 210 is three, and a number of the projection head is one. The optical transmission module 230 includes three source terminal transmission device 236 (e.g., optical fiber), an optical coupler 238, and a source terminal node 2382.

In the present embodiment, the projection head 220 includes light splitting device 222. The lights emitted from the light source modules 210 are the white light W1, W1', W1". Light energy of the white light W1, the white light W1', and the white light W1" may be the same or may be different. In step S11 of the operation method of the laser projection device 200, the first light emitted from the light source module 210 is transmitted to the optical coupler 238 through the source terminal transmission device 236. In the present embodiment, the first lights emitted by the three light source modules 210 are respectively the white light W1, the white light W1', and the white light W1". In step S22, the first lights (the white lights W1, W1', W1") are coupled by the optical coupler 238 to produce a second light (the white light W2) to the source terminal node 2382 of the optical transmission module 230. The optical coupler 238 may combine light energy of multiple first lights (the white lights W1, W1', W1"). Light energy of the white light W2 is a sum of light energy of the first lights (the white lights W1, W1', W1"). In step S23, the second light is transmitted to the projection head 220 through the optical transmission module 230 to project images.

In the present embodiment, the light source modules 210 and the projection head 220 are connected through the optical transmission module 230, but not mounted in the housing of the same projection device. Therefore, remote control of the laser projection device 200 can be achieved by employing the controller 240. In the present embodiment, light energy from the light source modules 210 can be combined through the optical coupler 238 so as to combine light energy from multiple light source modules 210 to a projection head 220, thereby projecting images with higher brightness.

In addition, in the present embodiment, at least one of the light source modules 210 can be controlled by the controller 240 to be turned off during operation such that this light source module 210 which is turned off may be employed as a backup light source module 210. For example, when two light source modules 210 are turned on, another light source module 210 is turned off, since light energy from the projection head 220 is combined from light energy of two first light (e.g., the white light W1, W1'), the controller 240 may turn on the backup light source module 210 to replace the failed one when any one of the light source module 210 in operation fails or is abnormal so as to maintain brightness of the projection head 220.

Figure 4B:
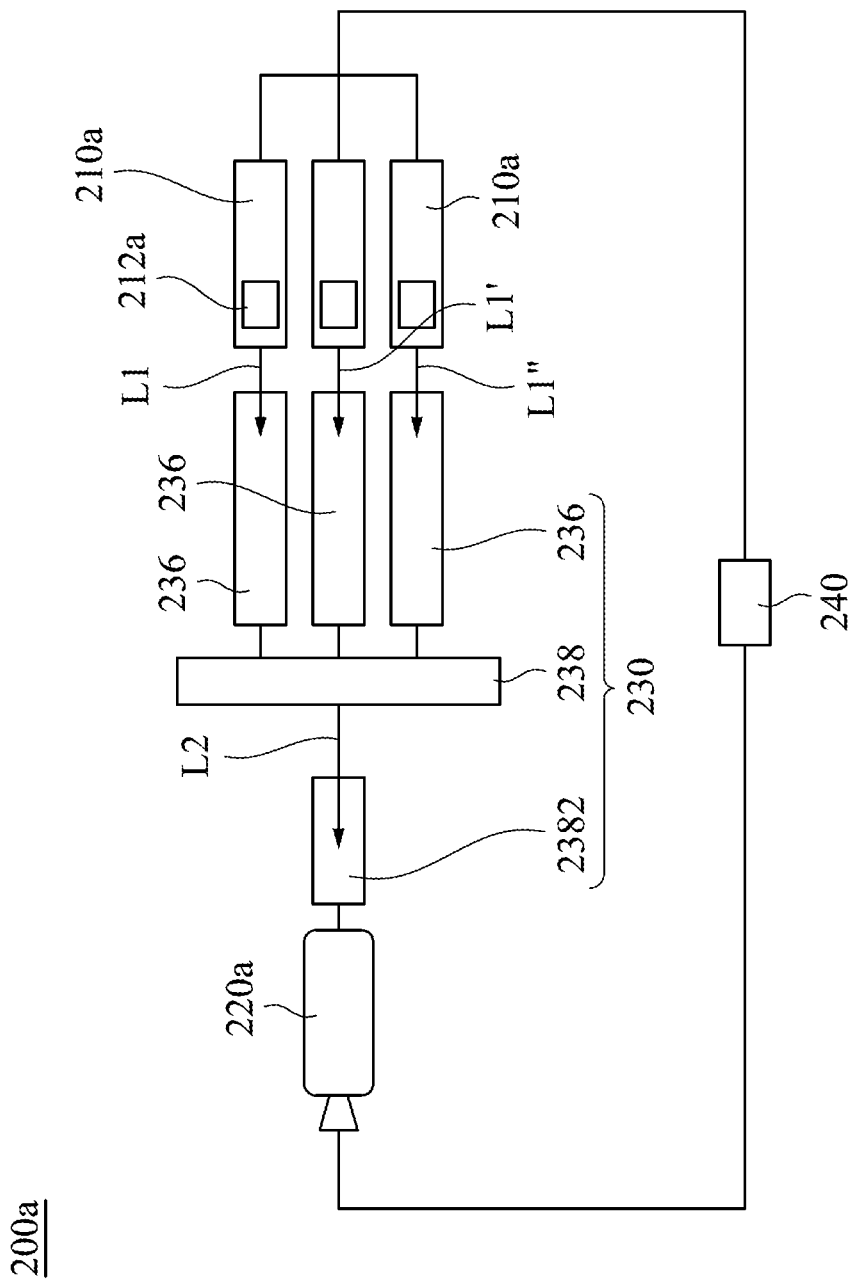

FIG. 4B is schematics of a laser projection device 200a according to another embodiment of the present disclosure. The laser projection device 200a is substantially the same as the laser projection device 200 shown in FIG. 4A, the difference is that the light source modules 210a includes light splitting device 212a, and the light splitting device 212a may be a filter color wheel or a phosphor wheel (not shown) containing multiple wave bands or may be a controller or a switch as mentioned above. As such, the first light (the light L1, L1', L1") emitted from each of the light source module 210a may be different color lights emitted based on a time sequence. For example, the color lights may be red lights, blue lights, and green lights, but the present disclosure is not limited in this regard.

Reference is made to FIG. 3 and FIG. 4B simultaneously. In step S21 of the operation method of the laser projection device 200a, the first light emitted from the light source module 210a is transmitted to the optical coupler 238 through the source terminal transmission device 236. In the present embodiment, the first lights (the lights L1, L1', L1") emitted from the three light source modules 210a may be different color lights that simultaneously emitted based on a time sequence. Light energy of the light L1, the light L1', and the light L1" may be the same or may be different. In step S22, the first lights (the lights L1, L1', L1") are coupled by the optical coupler 238 to produce a second light (the light L2) to the source terminal node 2382 of the optical transmission module 230. The optical coupler 238 may combine light energy of multiple first lights (the lights L1, L1', L1"). In the present embodiment, light energy of the second light (the light L2) is a sum of light energy of three first lights (the lights L1, L1', L1"). The second light (the light L2) are color lights with different colors based on the time sequence. In step S23, the second light (the light L2) containing color lights with different colors is transmitted to the projection head 220a to project images through the source terminal node 2382 of the optical transmission module 230. The laser projection device 200a has similar advantages as the laser projection device 200 shown in FIG. 4A, and the description is not repeated hereinafter.

In some embodiments, the light sources 210a and the optical transmission module 230 of the laser projection device 200a may be similar to the laser projection device 100b as shown in FIG. 2C. In other words, in step S21 as shown in FIG. 3, the light source module 210a may emit three color lights (the red light R, the blue light B, and the green light G), and the color lights from each of the light source modules 210a may be coupled by an optical coupling element (not shown) to a white light. The white light may be transmitted to the source terminal transmission module 236, and the white light from each of the light source modules 210a may be couple through the optical coupler 238 to the source terminal node 2382.

In some embodiments, the light sources 210a and the optical transmission module 230 of the laser projection device 200a may be similar to the laser projection device 100c as shown in FIG. 2D. In other words, in step S21 as shown in FIG. 3, the light source module 210a may emit three color lights (the red light R, the blue light B, and the green light G), and each of the color lights may be transmitted to the optical coupler (not shown) through corresponding source terminal transmission device (not shown), and the color lights may be coupled to the source terminal node 2382.

Figure 5:
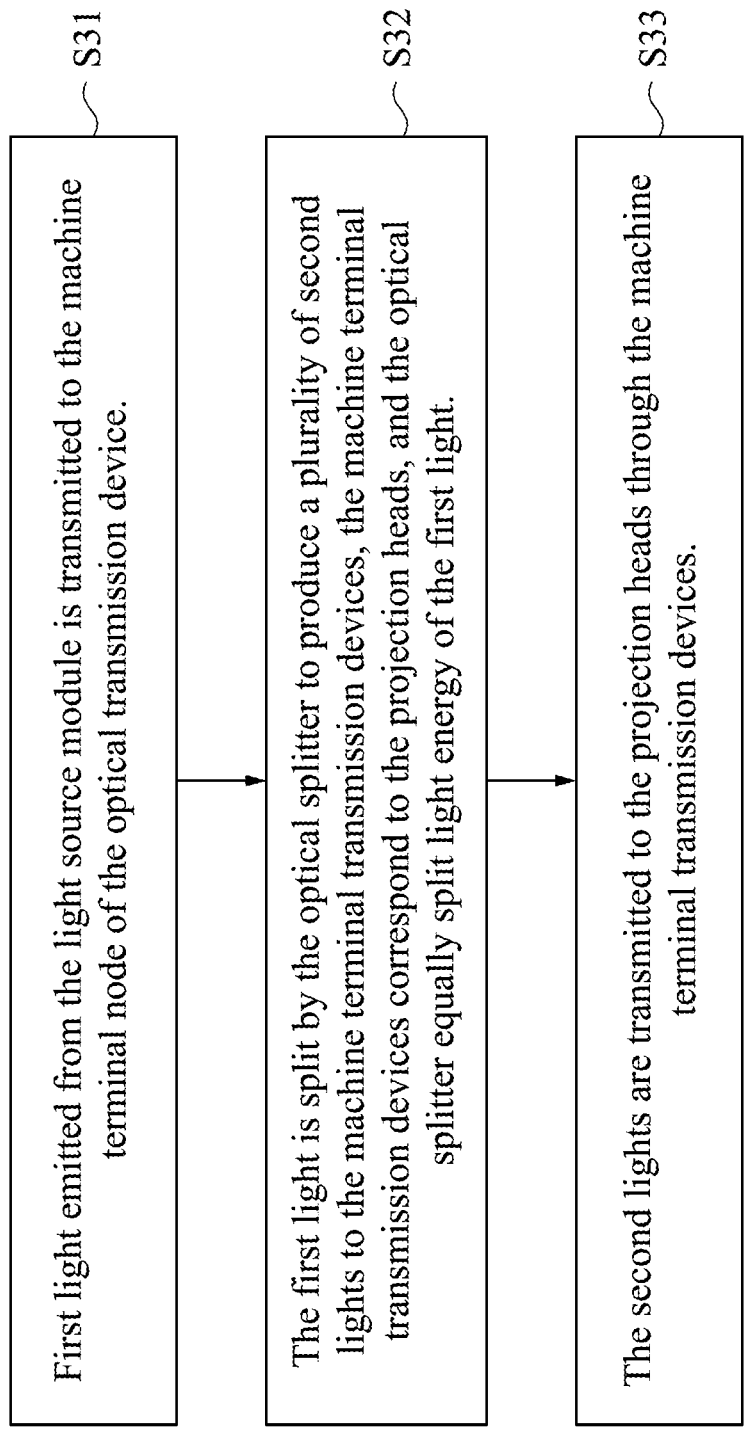
FIG. 5 is a flow chart of an operation method of a laser projection device according to some embodiments of the present disclosure.
Figure 6A:
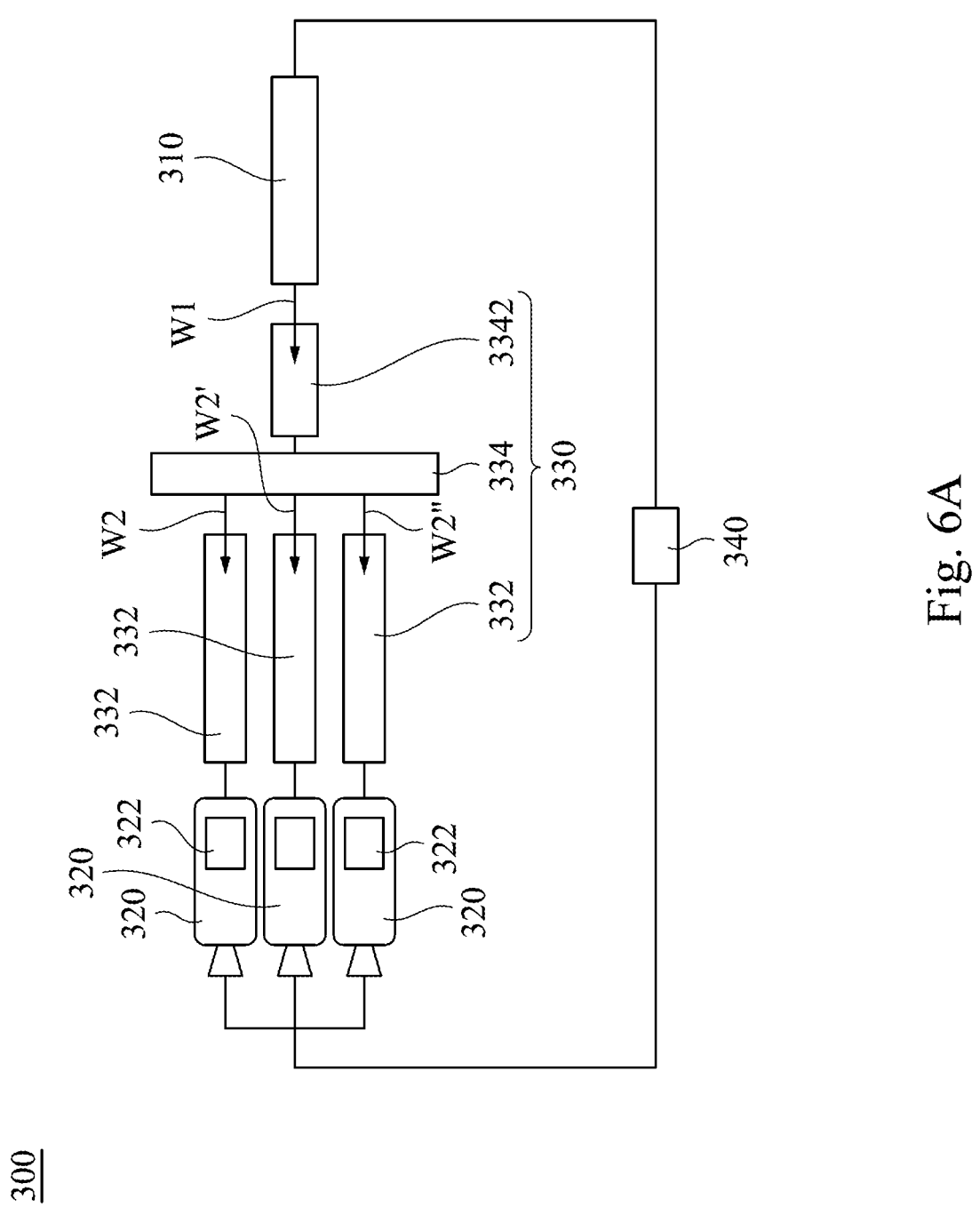
FIGS. 6A to 6C are schematics of a laser projection device according to some embodiments of the present disclosure.

FIG. 5 is a flow chart of an operation method of a laser projection device according to some embodiments of the present disclosure. FIG. 6A is schematic of a laser projection device 300 according to one embodiments of the present disclosure. Reference is made to FIG. 5 and FIG. 6A. The laser projection device 300 includes a light source module 310, projection heads 320, an optical transmission module 330, and a controller 340. In the present embodiment, a number of the light source module 310 is one, and a number of the projection heads 320 is three. The optical transmission module 330 includes three machine terminal transmission device 332 (e.g., optical fiber), an optical splitter 334, and a machine terminal node 3342.

In the present embodiment, the projection heads 320 include light splitting devices 322. The light emitted from the light source module 310 is the white light W1. In step S31 of the operation method of the laser projection device 300, the first light emitted from the light source module 310 is transmitted to the machine terminal node 3342 of the optical transmission module 330. In step S32, the first lights (the white lights W1) from the machine terminal node 3342 is split by the optical splitter 334 to produce a plurality of second lights (the white light W2, W2', W2") to three machine terminal transmission device 332. The machine terminal transmission devices 332 respectively correspond to the projection heads 320. In one embodiment, light energy of the first light (the white light W1 is equally split to three second lights (the white light W2, W2', W2") that have equal light energy. Therefore, light energy of each of the second light (the white light W2) that enters each of the projection heads 320 is one third of light energy of the first light (the white light W1). In another embodiment, light energy of the first light (the white light W1) \may be unequally split to second lights (the white light W2, W2', W2") with different light energy. In step S33, the second lights (the white light W2, W2', W2") are transmitted to the corresponding projection heads 320 through the machine terminal transmission device 332 to project images.

In the present embodiment, the light source modules 310 and the projection heads 320 are connected through the optical transmission module 330, but not mounted in the housing of the same projection device. Therefore, remote control of the laser projection device 300 can be achieved by employing the controller 340. In the present embodiment, light energy from the light source module 310 can be allocated through the optical splitter 334 so as to allocate light energy from the light source module 310 to multiple projection heads 320. For example, different images may be projected or larger images may be stitched by increasing numbers of the projection heads 320.

In addition, in the present embodiment, at least one of the projection heads 320 can be controlled by the controller 340 to be turned off during operation such that this projection head 320 which is turned off may be employed as a backup projection head 320. For example, since light energy from the projection head 320 is allocated through the optical splitter (that is, each of the projection heads 320 has a part of total light energy of the white light W1), the controller 340 may turn on the backup projection head 320 to replace the failed one when any one of the projection head 320 in operation fails or is abnormal.

Figure 6B:
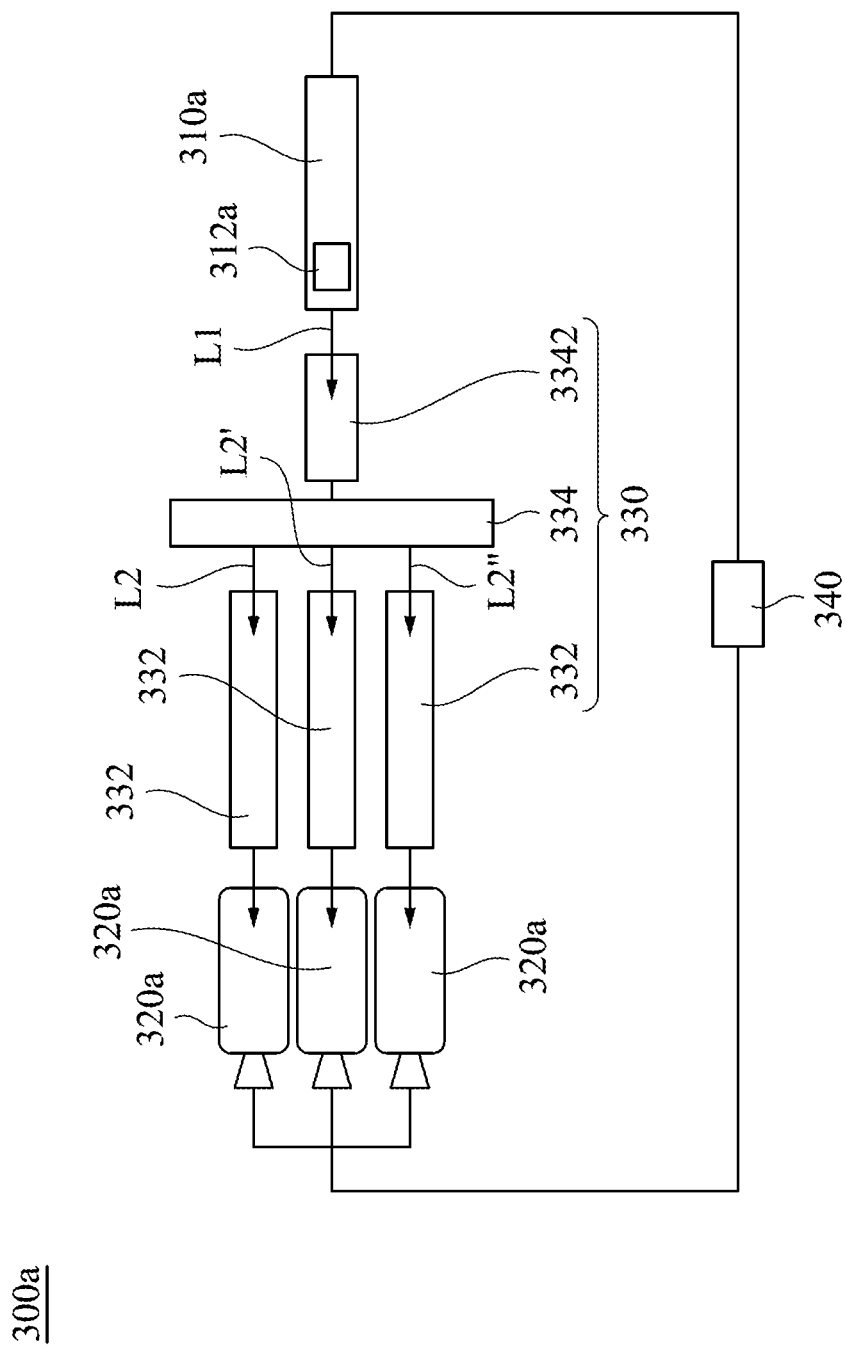

FIG. 6B is schematic of a laser projection device 300a according to another embodiment of the present disclosure. The laser projection device 300a is substantially the same as the laser projection device 300 shown in FIG. 6A, the difference is that the light source modules 310a includes light splitting device 312a, and the light splitting device 312a may be a filter color wheel or a phosphor wheel (not shown) containing multiple wave bands or may be a controller or a switch as mentioned above. As such, the light L1 emitted from each of the light source module 310a may be different color lights emitted based on a time sequence. For example, the color lights may be red lights, blue lights, and green lights, but the present disclosure is not limited in this regard.

Reference is made to FIG. 5 and FIG. 6B simultaneously. In step S31 of the operation method of the laser projection device 300a, the first light emitted from the light source module 310a is transmitted to the machine terminal node 3342 of the optical transmission device 330. In the present embodiment, the first lights (the lights L1) emitted from the light source module 310a may be different color lights that simultaneously emitted based on a time sequence. In step S32, the first light (the light L1) from the machine terminal node 3342 is allocated by the optical splitter 334 to produce a plurality of second lights (the light L2, L2', L2") to three machine terminal transmission devices 332. In one embodiment, light energy of the first light (the light L1) is equally allocated to three second lights (the lights L2, L2', L2") that have equal light energy. Therefore, light energy of the second light (the lights L2, L2', L2") that enters each of the projection heads 320a is one third of light energy of the first light (the light L1). In another embodiment, the first light (the light L1) may be unequally split to second lights (the light L2, L2', L2") with different light energy. In step S33, the second lights (the light L2, L2', L2") are transmitted to three projection heads 320a through the machine terminal transmission device 332 to project images. The laser projection device 300a has similar advantages as the laser projection device 300 shown in FIG. 6A, and the description is not repeated hereinafter.

Figure 6C:
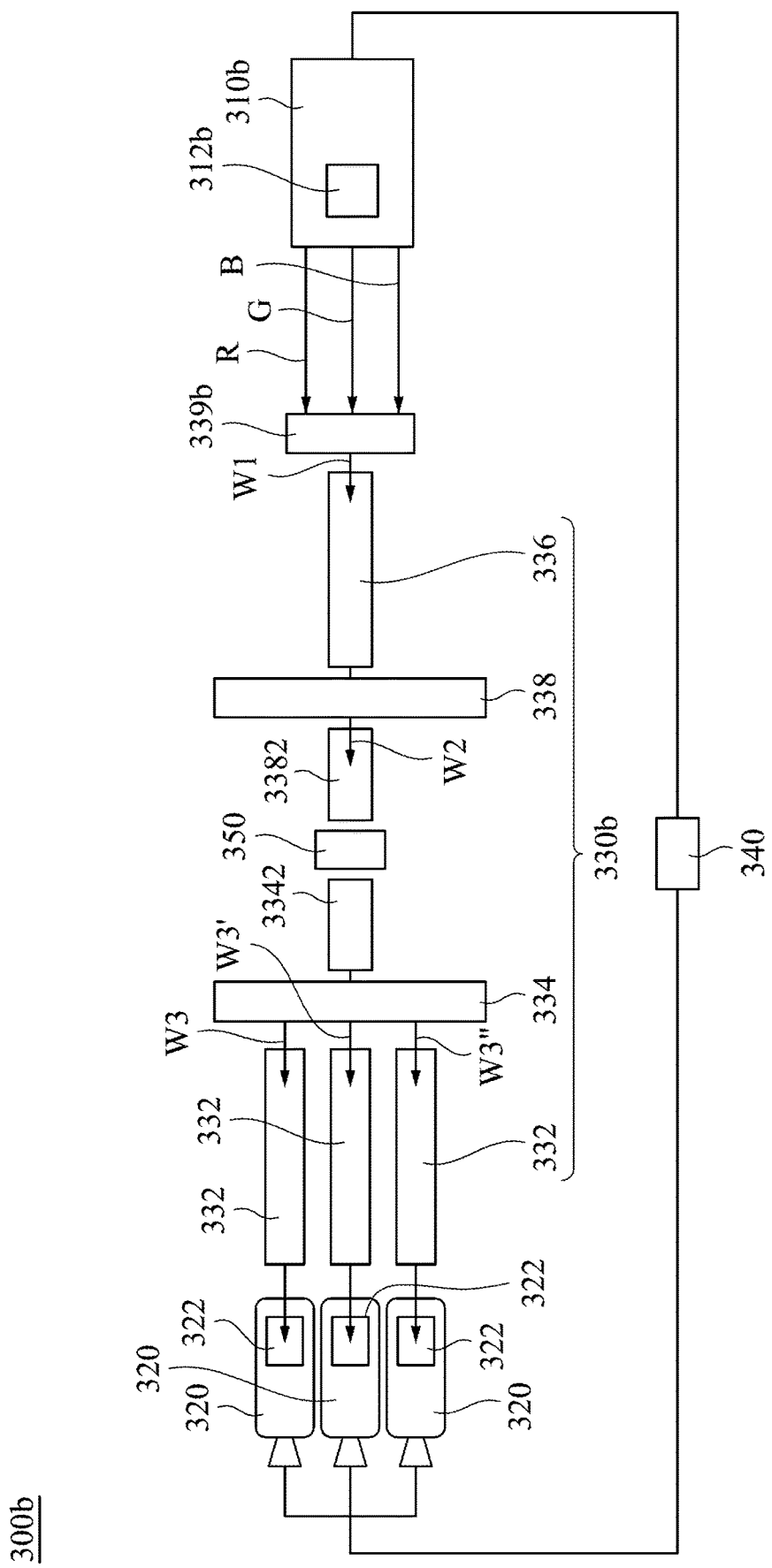

FIG. 6C is schematic of a laser projection device 300b according to another embodiment of the present disclosure. The laser projection device 300b is substantially the same as the laser projection device 300a shown in FIG. 6B, the difference is that the light source modules 310b is configured to emit multiple color lights with different colors through a light splitting devices 312b. For example, the color lights may be a red light R, a blue light B, and a green light G, but the present disclosure is not limited in this regard. In addition, the projection heads 320 include light splitting devices 322, the laser projection device 300b further includes a homogenizer 350 and an optical coupling element 339b. In some embodiments, the optical coupling element 339b may be a prism. The optical transmission module 330b further includes a source terminal transmission device 336, an optical coupler 338, and a source terminal node 3382.

Reference is made to FIG. 5 and FIG. 6C. In step S31 of the operation method of the laser projection device 300b, the first light emitted from the light source module 310b (the red light R, the blue light B, and the green light G) is transmitted to the machine terminal node 3342 of the optical transmission module 330. In the present embodiment, step S31 further includes coupling three different color lights through the optical coupling element 339b to a white light W1 and transmitting the white light W1 to the source terminal transmission devices 336. The white light W1 from the source terminal transmission devices 336 is transmitted to the source terminal node 3382 through the optical coupler 338, and then the white light W1 is transmitted to the machine terminal node 3342 through the homogenizer 350. In some embodiment, the optical coupler 338 and the source terminal node 3382 may be omitted. That is, the light from the source terminal transmission devices 336 may directly enter the homogenizer 350 and is transmitted to the machine terminal node 3342. In step S32 to step S33, the operation method of the laser projection device 300b is substantially the same as the laser projection device 300, and the description is not repeated in this regard.

In some embodiments, the light sources 310b and the optical transmission module 330b of the laser projection device 300b may be similar to the laser projection device 100c as shown in FIG. 2D. In other words, in step S31 as shown in FIG. 5, three color lights (the red light R, the blue light B, and the green light G) may be respectively transmitted to the optical coupler through corresponding source terminal transmission device and then be coupled to the source terminal node. Subsequently, the coupled light may be transmitted to the machine terminal node through the homogenizer.

Figure 7:
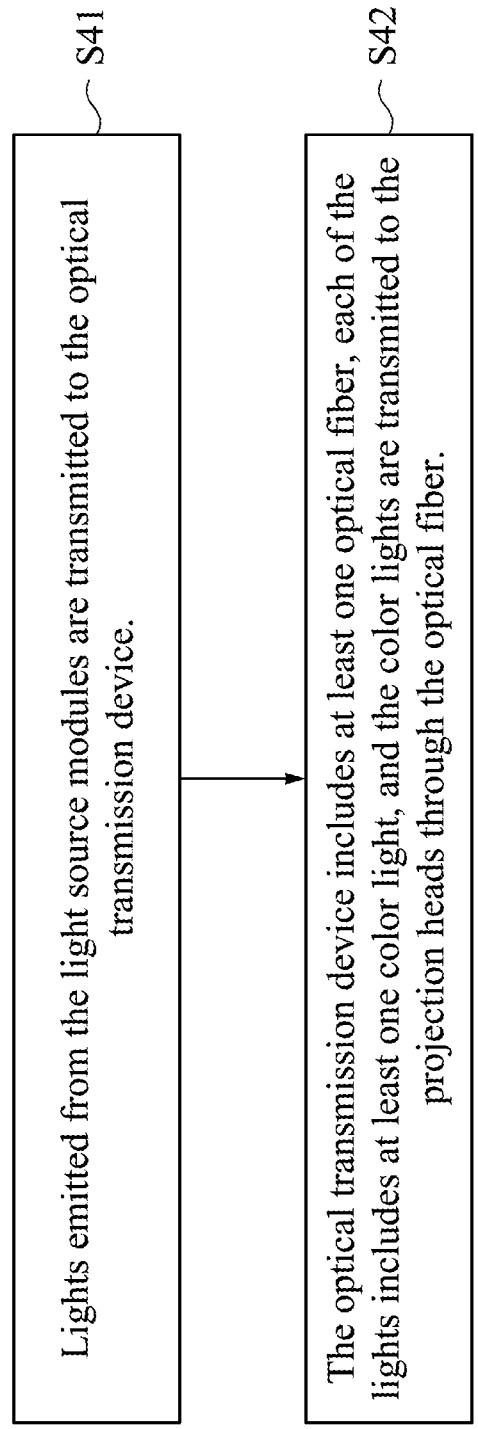
FIG. 7 is a flow chart of an operation method of a laser projection device according to some embodiments of the present disclosure.
Figure 8A:
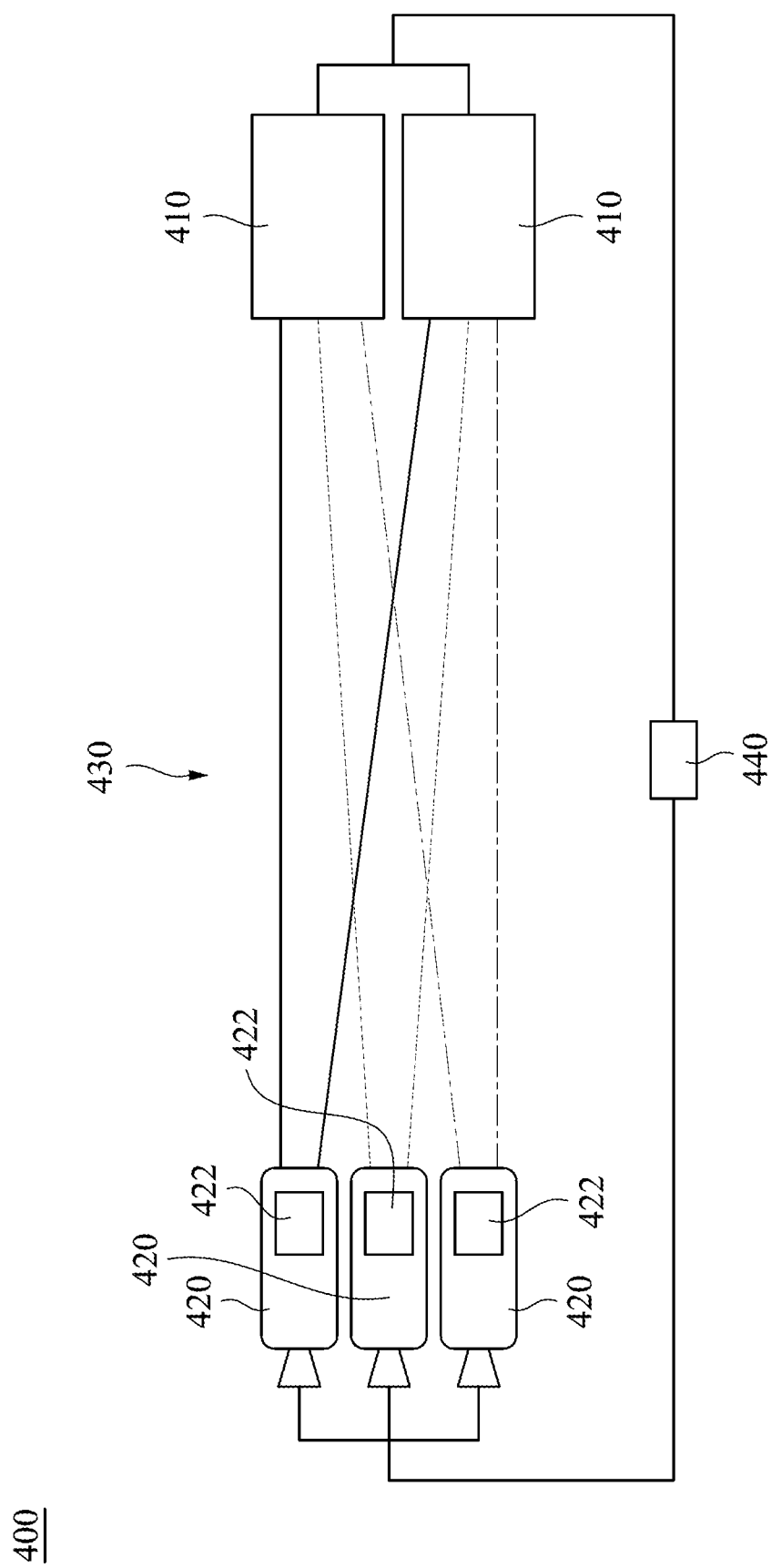
FIGS. 8A to 8C are schematics of a laser projection device according to some embodiments of the present disclosure.

FIG. 7 is a flow chart of an operation method of a laser projection device according to some embodiments of the present disclosure. FIG. 8A is schematic of a laser projection device 400 according to one embodiments of the present disclosure. Reference is made to FIG. 7 and FIG. 8A. The laser projection device 400 includes light source modules 410, projection heads 420, an optical transmission module 430, and a controller 440. In the present embodiment, the light source modules 410 are configured to emit white light, and the projection heads 420 includes optical splitting devices 422. The optical transmission module 430 includes multiple optical fibers configured to connect each of the light source modules 410 and the projection heads 420. For example, each of the light source modules 410 is connected with three optical fibers and the light source modules 410 are respectively connected to the projection heads 420.

In step S41 of the operation method of the laser projection device 400, the white lights emitted from the light source modules 410 are transmitted to the optical transmission module 430. In step S42, the white lights are transmitted to the projection heads 420 through corresponding optical fibers so as to allocate light energy from two light source modules 410 to three projection heads 420.

In the present embodiment, the light source modules 410 and the projection heads 420 are connected through the optical transmission module 430, but not mounted in the housing of the same projection device. Therefore, remote control of the laser projection device 400 can be achieved by employing the controller 440. In the present embodiment, light energy from the light source modules 410 can be equally split to three parts through the optical fibers so as to allocate light energy from the light source modules 410 to multiple projection heads 420.

In addition, in the present embodiment, at least one of the projection heads 420 can be controlled by the controller 440 to be turned off during operation such that this projection head 420 which is turned off may be employed as a backup projection head 420. Similarly, in some embodiment, at least one of the light source modules 410 can be controlled by the controller 440 to be turned off during operation so as to employee this light source module 410 which is turned off as a backup light source module 410. For example, since light energy of the projection heads 420 are equal (that is, each of the projection heads 420 has one third of the total light energy), the controller 440 may turn on the backup projection head 420 to replace the failed one when any one of the projection head 420 in operation fails or is abnormal.

Figure 8B:
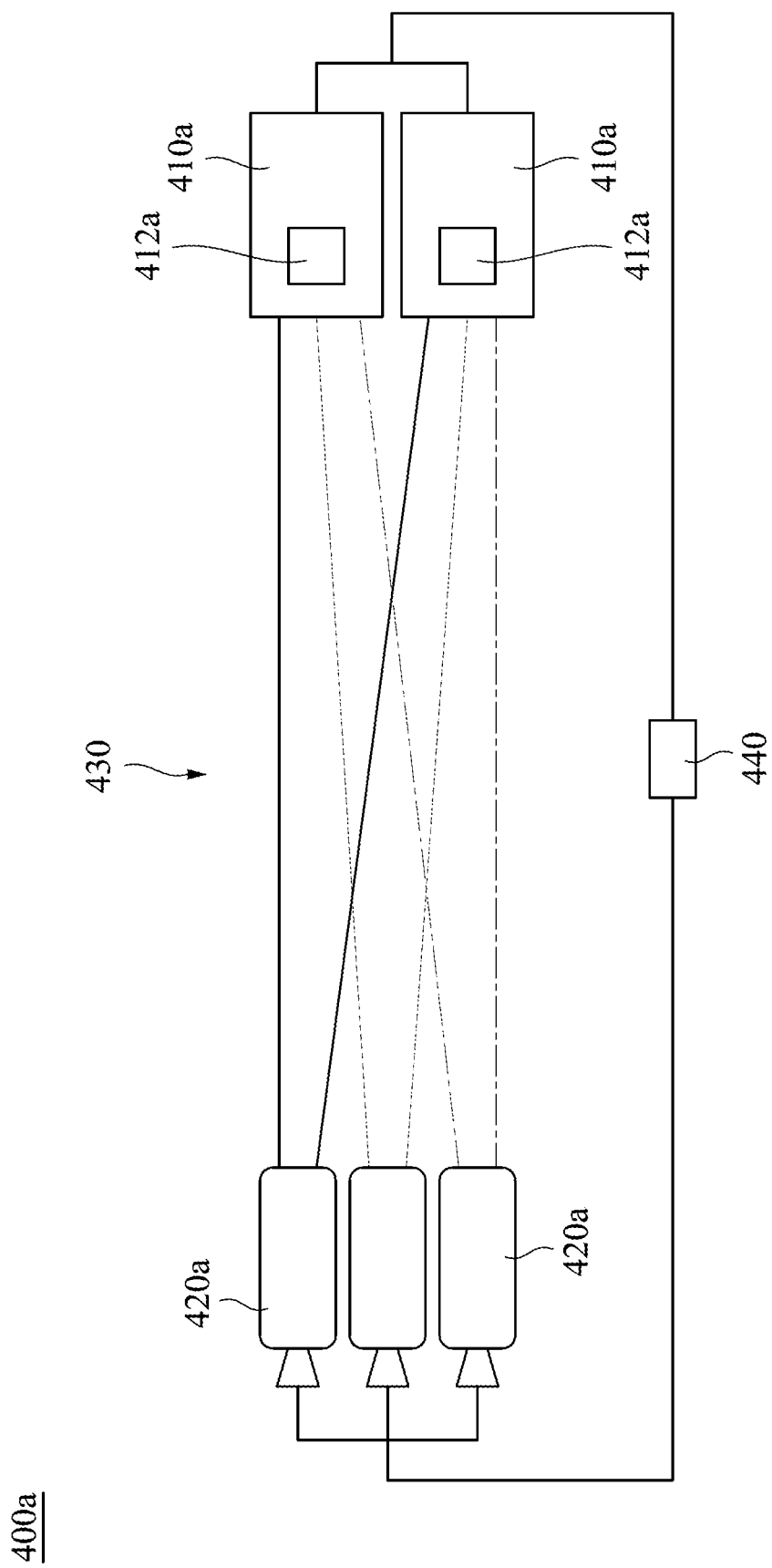

FIG. 8B is schematic of a laser projection device 400a according to another embodiment of the present disclosure. The laser projection device 400a is substantially the same as the laser projection device 400 shown in FIG. 8A, the difference is that the light source modules 410a includes light splitting device 412a, and the light splitting device 412a may be a filter color wheel or a phosphor wheel (not shown) containing multiple wave bands or may be a controller or a switch as mentioned above. As such, the light emitted from each of the light source modules 410a may be different color lights emitted based on a time sequence. For example, the color lights may be red lights, blue lights, and green lights, but the present disclosure is not limited in this regard. The laser projection device 400a has similar advantages as the laser projection device 400 shown in FIG. 8A, and the description is not repeated hereinafter.

Figure 8C:
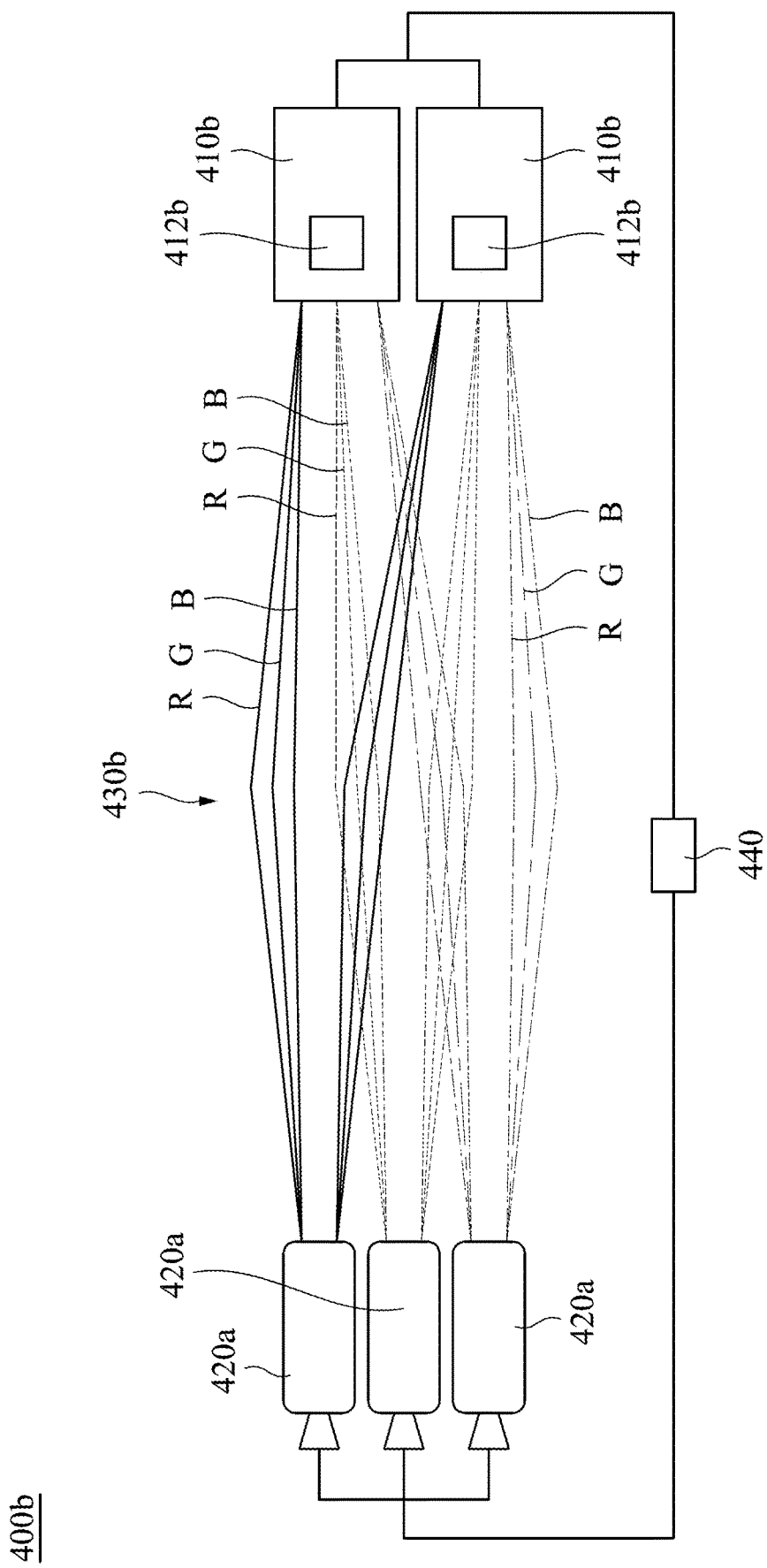

FIG. 8C is schematic of a laser projection device 400b according to another embodiment of the present disclosure. The laser projection device 400b is substantially the same as the laser projection device 400 shown in FIG. 8A, the difference is that the light source modules 410b includes light splitting device 412b, and the light splitting device 412b may be a filter color wheel or a phosphor wheel (not shown) containing multiple wave bands or may be a controller or a switch as mentioned above. As such, the light emitted from each of the light source modules 410b may be different color lights. For example, the color lights may be red lights, blue lights, and green lights, but the present disclosure is not limited in this regard. In step S41 of the operation method of the laser projection device 400, each of the color lights emitted from the light source modules 410b are transmitted to the optical transmission module 430. In step S42, each of the color lights of each of the light source module 410b is transmitted to the projection heads 420a through corresponding optical fibers. The laser projection device 400b has similar advantages as the laser projection device 400a shown in FIG. 8B, and the description is not repeated hereinafter.

Figure 9:
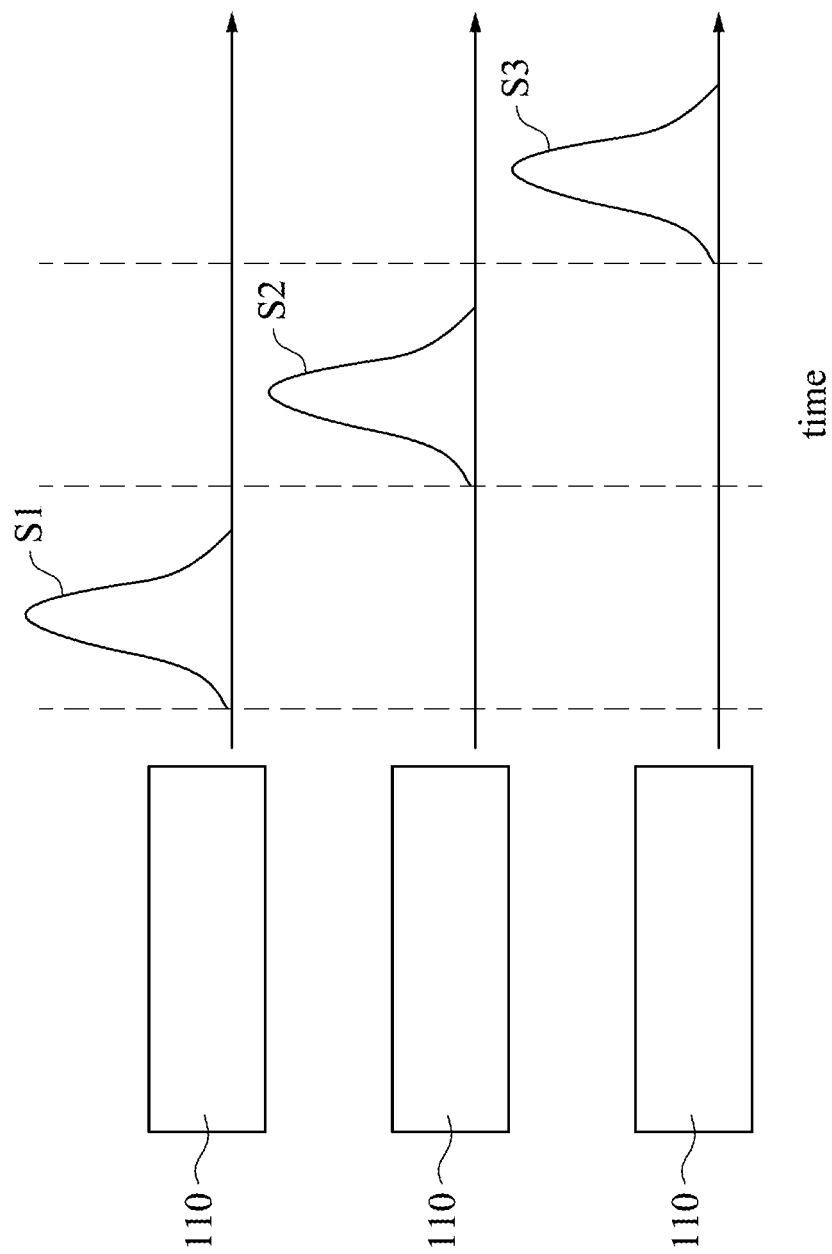
FIG. 9 is a schematic of a safe inspection method of a laser projection device according to some embodiments of the present disclosure.

FIG. 9 is a schematic of a safe inspection method of a laser projection device according to some embodiments of the present disclosure. In the present embodiment, three light source modules 110 may sequentially emit detecting signals S1, S2, S3. The signals S1, S2, S3 may be transmitted to multiple projection heads (not shown). The controller (see FIG. 2A) may determine whether at least one of the projection head, the optical transmission module, and the light source module 110 is abnormal based on the detecting signal received by the projection head. In some embodiments, the detecting signals S1, S2, S3 are invisible light (e.g., infrared light or UV light). The visible light for projecting images and the bands of the invisible light for performing safe inspection may be separated by filter. As such, safe inspection and image projection can be performed at the same time. In some embodiment, a time sequence, wavelength or amplitude of the detecting signal S1, S2, S3 can be adjusted based on the requirements of users so as to increase precision of safe inspection.

As described above, the operation method of the remote laser projection device of the present disclosure, light energy from the light source modules may be allocated to the projection heads through the optical transmission module (the optical fiber, the optical splitter, and the optical coupler etc.) so as to overcome the limit of the typical projection device that the light source and the projection head are located in the same housing. Therefore, light energy of the projection head may be adjusted based on change of environment. In addition, although light energy from the light source modules may decay when light energy is split or combined through the optical splitter or the optical coupler, the optical coupler and the homogenizer may combine and integrate the light energy so as to maintain the light energy allocated to each of the projection heads.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An operation method of a remote laser projection device, comprising:
    emitting a first light to an optical transmission module through plurality of light source modules, wherein the first light emitted from the light source module is an effective white light or comprises a plurality of color lights with different colors;
    transmitting the first light of each of the light source modules to an optical coupler through at least one source terminal transmission device;
    coupling the first lights of the light source modules through the optical coupler to produce a second light to a source terminal node, wherein energy of the first lights is combined through the optical coupler; and
    transmitting the second light to at least one projection head through the source terminal node of the optical transmission module; and
    wherein total light energy of the first light is allocated to the projection head through the optical transmission module, energy of a light transmitted to the projection device is E/N, and wherein E is total light energy of the light source modules, and N is a number of the at least one projection device.

2. The operation method of the remote laser projection device of claim 1, wherein the optical transmission module comprises at least one optical fiber, the first light includes at least one color light, and transmitting the first light to the projection head through the optical transmission module further comprises:
    transmitting the color light to the projection head through the optical fiber.

3. The operation method of the remote laser projection device of claim 1, wherein the color lights with different colors are emitted based on a time sequence.

4. The operation method of the remote laser projection device of claim 3, wherein the optical transmission module further comprises a plurality of optical coupling elements, each of the first lights comprises a plurality of color lights with different colors, the optical coupling elements respectively correspond to the light source modules, and the operation method of the remote laser projection device further comprises:
    before transmitting each of the first lights to the optical coupler through the source terminal transmission device, coupling the color lights from each of the light source modules through the corresponding optical coupling element.

5. The operation method of the remote laser projection device of claim 3, wherein the first light includes a plurality of color lights with different colors, and the operation method of the remote laser projection device further comprises:
    before transmitting the first light of each of the light source modules to the optical coupler through the source terminal transmission device, transmitting the color lights of each of the first lights to the optical coupler through the source terminal transmission device.

6. The operation method of the remote laser projection device of claim 1, wherein a number of the at least one projection head is plural, and transmitting the second light to the projection head through the source terminal node of the optical transmission module further comprises:
    transmitting the second light of the light source modules to a machine terminal node of the optical transmission module from the source terminal node;
    equally splitting the second light through an optical splitter to produce a plurality of third lights to a plurality of machine terminal transmission devices, wherein the machine terminal transmission devices correspond to the projection heads, and the optical splitter equally split energy of the second light; and
    respectively transmitting the third lights to the projection heads through the machine terminal transmission devices.

7. The operation method of the remote laser projection device of claim 6, wherein the color lights with different colors are emitted based on a time sequence.

8. The operation method of the remote laser projection device of claim 6, further comprising:
    before transmitting the second light of the light source modules to the machine terminal node of the projection head, transmitting the second light to the machine terminal node through a homogenizer.

9. The operation method of the remote laser projection device of claim 1, further comprising:
    turning on or turning off each of the light source modules and the projection head through a controller.

10. An operation method of a remote laser projection device, comprising:
    emitting a first light to an optical transmission module through a light source module, wherein the first light emitted from the light source module is an effective white light or comprises a plurality of color lights with different colors;
    transmitting the first light of the light source module to a machine terminal node of the optical transmission module;
    equally splitting the first light through an optical splitter to produce a plurality of second lights to a plurality of machine terminal transmission devices, wherein the machine terminal transmission devices correspond to a plurality of projection heads, and the optical splitter equally split total energy of the first light; and transmitting the second lights to the projection heads respectively through the machine terminal transmission devices, wherein total light energy of the first light is allocated to the projection heads through the optical transmission module, energy of a light transmitted to the projection device is E/N, and wherein E is total light energy of the light source module, and N is a number of the projection heads.

11. The operation method of the remote laser projection device of claim 10, wherein the color lights with different colors are emitted based on a time sequence.

12. The operation method of the remote laser projection device of claim 10, wherein the optical transmission module further comprises a plurality of optical coupling elements, the first light includes a plurality of color lights with different colors, and the operation method of the remote laser projection device further comprises:

before transmitting the first light of the light source module to the machine terminal node of the optical transmission device, coupling the color lights from the light source module through the optical coupling element to a source terminal transmission device.

13. The operation method of the remote laser projection device of claim 10, wherein the first light includes a plurality of color lights with different colors, and the operation method of the remote laser projection device further comprises:

before transmitting the first light of the light source module to the machine terminal node of the optical transmission device, transmitting the color lights of the first light respectively through a source terminal transmission device to an optical coupler.

14. The operation method of the remote laser projection device of claim 13, further comprising:

Before transmitting the first light of the light source module to the machine terminal node of the optical transmission device, transmitting the first light through a homogenizer to the machine terminal node.

15. An operation method of a remote laser projection device, comprising:

emitting a first light to an optical transmission module through at least one light source module, comprising:
transmitting the first light of the light source module to a machine terminal node of the optical transmission module; and
splitting the first light through a splitter to produce a plurality of second lights to a plurality of machine terminal transmission devices, wherein the machine terminal transmission devices correspond to a plurality of projection heads; and transmitting the second lights to the projection heads respectively through the machine terminal transmission device wherein total light energy of the first light is allocated to the projection heads through the optical transmission module, the first light is transmitted by the optical transmission module through a plurality of optical fibers, and the first light is an effective white light, light energy of at least one of the lights emitted to the projection heads is different from light energy of other lights.

16. The operation method of the remote laser projection device of claim 15, wherein the first light comprises at least one color light, and transmitting the first light to the projection heads through the optical transmission module further comprises:

transmitting the color light to the projection heads through the optical fibers.

17. The operation method of the remote laser projection device of claim 15, wherein the optical transmission module further comprises an optical coupling element, the first light comprises a plurality of color lights with different colors, and emitting the first light to the optical transmission module through the light source module further comprises:

before transmitting the first light of the light source module to the machine terminal node of the optical transmission module, coupling the color lights from the light source module to a source terminal transmission device through the optical coupling element.

18. The operation method of the remote laser projection device of claim 15, wherein the first light comprises a plurality of color lights with different colors, and emitting the first light to the optical transmission module through the light source module further comprises:

before transmitting the first light of the light source module to the machine terminal node of the optical transmission module, transmitting the color lights of the first light to an optical coupling element respectively through a source terminal transmission device.

19. An operation method of a remote laser projection device, comprising:

transmitting a first light of a light source module to a machine terminal node of an optical transmission module through a homogenizer;
splitting the first light through a splitter to produce a plurality of second lights to a plurality of machine terminal transmission devices, wherein the machine terminal transmission devices correspond to a plurality of projection heads; and
transmitting the second lights to the projection heads respectively through the machine terminal transmission devices, wherein total light energy of the first light is allocated to the projection heads through the optical transmission module, the first light is transmitted by the optical transmission module through a plurality of optical fibers, and the first light is an effective white light, light energy of at least one of the lights emitted to the projection heads is different from light energy of other lights.

20. An operation method of a remote laser projection device, comprising:

emitting a first light to an optical transmission module through a plurality of light source modules, comprising:
transmitting the first light of each of the light source modules to an optical coupler through at least one source terminal transmission device;
coupling the first lights of the light source modules to a source terminal node of the optical transmission module through the optical coupler, wherein light energy of the first lights is combined through the optical coupler; and
transmitting the coupled first lights to a machine terminal nodes through the optical coupler;
splitting the first light through a splitter to produce a plurality of second lights to a plurality of machine terminal transmission devices, wherein the machine terminal transmission devices correspond to a plurality of projection heads; and transmitting the second lights to the projection heads respectively through the machine terminal transmission devices, wherein total light energy of the first light is allocated to the projection heads through the optical transmission module, the first light is transmitted by the optical transmission module through a plurality of optical fibers, and the first light is an effective white light, light energy of at least one of the lights emitted to the projection heads is different from light energy of other lights.

* * * * *